US009068069B2

(12) United States Patent
Noguchi et al.

(10) Patent No.: US 9,068,069 B2
(45) Date of Patent: Jun. 30, 2015

(54) PERFLUOROELASTOMER COMPOSITIONS AND METHODS OF PREPARING SAME

(75) Inventors: Tsuyoshi Noguchi, Settsu (JP);
Jiazhong Luo, Lansdale, PA (US);
Tatsuya Morikawa, Settsu (JP);
Hirokazu Komori, Settsu (JP);
Takafumi Yamato, Settsu (JP); Meiten Koh, Settsu (JP)

(73) Assignees: Greene, Tweed Technologies, Inc., Kulpsville, PA (US); Daikin Industries, Ltd., Osaka (JP)

( * ) Notice: Subject to any disclaimer, the term of this patent is extended or adjusted under 35 U.S.C. 154(b) by 0 days.

(21) Appl. No.: 12/969,463

(22) Filed: Dec. 15, 2010

(65) Prior Publication Data

US 2011/0086229 A1    Apr. 14, 2011

Related U.S. Application Data

(62) Division of application No. 12/148,014, filed on Apr. 16, 2008.

(60) Provisional application No. 60/958,658, filed on Jul. 6, 2007, provisional application No. 60/915,729, filed on May 3, 2007.

(30) Foreign Application Priority Data

Apr. 16, 2007   (JP) .................................. 2007-107457

(51) Int. Cl.
C08L 27/18        (2006.01)
C08K 5/18         (2006.01)

(52) U.S. Cl.
CPC ............ C08L 27/18 (2013.01); *Y10T 428/3154* (2015.04); *C08K 5/18* (2013.01); *C08L 2205/02* (2013.01)

(58) Field of Classification Search
CPC ........................ C08L 27/18; C08L 2666/04
USPC ............ 524/520, 544, 546; 525/200; 526/247
See application file for complete search history.

(56) References Cited

U.S. PATENT DOCUMENTS

| 3,484,503 | A |   | 12/1969 | Magner et al. |
|---|---|---|---|---|
| 3,546,186 | A | * | 12/1970 | Sullivan et al. ................ 526/245 |
| 3,723,577 | A | * | 3/1973 | Stivers ........................... 525/199 |
| 4,281,092 | A | * | 7/1981 | Breazeale ....................... 526/247 |
| 4,413,094 | A |   | 11/1983 | Aufdermarsh, Jr. |
| 4,713,418 | A |   | 12/1987 | Logothetis et al. |
| 5,260,351 | A |   | 11/1993 | Logothetis |
| 5,447,993 | A |   | 9/1995 | Logothetis |
| 5,677,389 | A |   | 10/1997 | Logothetis et al. |
| 5,696,189 | A |   | 12/1997 | Legare |
| 5,700,879 | A |   | 12/1997 | Yamamoto et al. |
| 5,767,204 | A | * | 6/1998 | Iwa et al. ....................... 525/359.3 |
| 5,874,523 | A |   | 2/1999 | Schmiegel |
| 5,891,941 | A |   | 4/1999 | Tanaka et al. |
| 6,211,319 | B1 |   | 4/2001 | Schmiegel |
| 6,323,283 | B1 |   | 11/2001 | Apostolo et al. |
| 6,503,986 | B1 |   | 1/2003 | Tanaka et al. |
| 6,638,999 | B2 |   | 10/2003 | Bish et al. |
| 6,710,132 | B2 |   | 3/2004 | Apostolo et al. |
| 6,730,760 | B2 |   | 5/2004 | Grootaert et al. |
| 6,737,479 | B2 |   | 5/2004 | Faulkner |
| 6,855,774 | B2 |   | 2/2005 | Kawasaki et al. |
| 6,878,778 | B1 |   | 4/2005 | Kawasaki et al. |
| 6,890,995 | B2 | * | 5/2005 | Kolb et al. ................ 525/326.3 |
| 7,019,083 | B2 |   | 3/2006 | Grootaert et al. |
| 7,247,749 | B2 |   | 7/2007 | Aufdermarsh et al. |
| 7,514,506 | B2 |   | 4/2009 | Mansfield et al. |
| 7,521,510 | B2 |   | 4/2009 | Aufdermarsh et al. |
| 7,666,948 | B2 |   | 2/2010 | Aizawa et al. |

(Continued)

FOREIGN PATENT DOCUMENTS

| CN | 1387551 A | 12/2002 |
|---|---|---|
| JP | 11-092529 A1 | 4/1999 |

(Continued)

OTHER PUBLICATIONS

Nunno et. al "Toxic Waste Minimization, in the Printed Circuit Board Industry", 1988, p. 162.
International Search Report, Written Opinion from counterpart Application PCT/US08/04890, Oct. 2009.
International Preliminary Report on Patentability from counterpart Application PCT/US08/04890, Jul. 2008.
Chinese First Office Action (English Language Version) from Chinese Counterpart 20080012321.6, (Jun. 2011), 9 pages (now granted).

(Continued)

*Primary Examiner* — Nicole M Buie-Hatcher
(74) *Attorney, Agent, or Firm* — Flaster/Greenberg P.C.

(57) ABSTRACT

The present invention includes crosslinked perfluoroelastomeric compositions and molded articles formed from a crosslinkable perfluoroelastomeric composition having a first curable perfluoropolymer having a cure site monomer and a second perfluoropolymer having a cure site monomer. The molar ratio of the tetrafluoroethylene monomer to perfluoroalkylvinyl ether in one perfluoropolymer is about 0 to 100 to about 65 to 35 in the perfluoropolymer. The molar ratio of the tetrafluoroethylene monomer to the perfluoroalkylvinyl ether monomer in the second polymer is about 65:35 to about 95:5 in the second perfluoropolymer. The composition further includes a curative. One fluorine-containing elastomer composition herein, having a short crosslinking time, has perfluoroelastomers (A) having a tetrafluoroethylene unit, a perfluoroalkylvinyl ether unit (a) and a monomer unit (b) having at least one kind selected from the group consisting of a nitrile group, a carboxyl group and an alkoxycarbonyl group, wherein the composition has two or more kinds of perfluoroelastomers (A) having differing contents of perfluoroalkylvinyl ether unit (a).

29 Claims, No Drawings

(56) References Cited

U.S. PATENT DOCUMENTS

| | | |
|---|---|---|
| 8,367,776 B2 | 2/2013 | Noguchi et al. |
| 2001/0047048 A1 | 11/2001 | Saito |
| 2004/0024133 A1 | 2/2004 | Hetherington |
| 2004/0122163 A1 | 6/2004 | Grootaert et al. |
| 2004/0122182 A1 | 6/2004 | Kawasaki et al. |
| 2005/0107544 A1 | 5/2005 | Wang |
| 2005/0261431 A1 | 11/2005 | Takahashi et al. |
| 2006/0148991 A1 | 7/2006 | Aizawa et al. |
| 2006/0292373 A1 | 12/2006 | Kuboyama et al. |
| 2007/0049698 A1* | 3/2007 | Grootaert et al. .......... 525/326.2 |
| 2008/0035883 A1 | 2/2008 | Andreevich et al. |
| 2009/0253854 A1* | 10/2009 | Xu et al. ..................... 524/520 |
| 2009/0306296 A1 | 12/2009 | Nanba et al. |
| 2009/0312473 A1 | 12/2009 | Kanega et al. |

FOREIGN PATENT DOCUMENTS

| | | |
|---|---|---|
| JP | 2002-293831 A | 10/2002 |
| JP | 2006-511660 T | 4/2006 |
| JP | 2007-137994 A | 6/2007 |
| KR | 10-2007-0021267 A | 2/2007 |
| WO | WO 00/08076 A1 | 2/2000 |
| WO | WO 00/29479 A1 | 5/2000 |
| WO | WO 02/060969 A1 | 8/2002 |
| WO | WO 2006/057666 A1 | 1/2006 |
| WO | WO 2006/120882 A1 | 11/2006 |

OTHER PUBLICATIONS

Response to First Chinese Office Action (and translation) from Chinese Counterpart 20080012321.6 (Jan. 2012), 22 pages.
Chinese Second Office Action from Chinese Counterpart 20080012321.6, (Mar. 2012) and translation, 9 pages.
Response to Second Chinese Office Action (and translation) from Chinese Counterpart 20080012321.6 (Jul. 2012), 42 pages.
Chinese Third Office Action (and translation) from Chinese Counterpart 20080012321.6, (Oct. 2012), 10 pages.
Response to Office Action (and translation) from Chinese Counterpart 20080012321.6 (Mar. 2013), 11 pages.
Chinese First Office Action from Chinese Divisional Counterpart 20130084316.9 (Sep. 2014) and translation (23 pages) (pending).
Japanese Office Action from Japanese Counterpart 2010-504073 (and translation) (Nov. 2012), 10 pages (granted).
Response to Japanese Office Action in Japanese Counterpart 2010-504073 and translation with notice of grant (Jun. 2013), 21 pages.
Korean First Office Action from Korean Counterpart 10-2009-7023825 and translation (Apr. 2014), 11 pages (pending).
Response to Korean First Office Action from Korean Counterpart 10-2009-7023825 (Oct. 2014), 27 pages.
Taiwan First Office Action from Taiwan Counterpart Application No. 097139763 and translation from (Jun. 2012), (granted), 14 pages.
Response to First Taiwan Office Action in Taiwan Counterpart Application No. 097139763 and translation of amended claims (Dec. 2012), 19 pages.

* cited by examiner

PERFLUOROELASTOMER COMPOSITIONS AND METHODS OF PREPARING SAME

CROSS-REFERENCE TO RELATED APPLICATIONS SECTION

This patent application is a division of U.S. patent application Ser. No. 12/148,014 and claims priority thereto under 35 U.S.C. §120. U.S. patent application Ser. No. 12/148,014 claims the benefit under 35 U.S.C. §119(e) of U.S. Provisional Patent Applications Nos. 60/958,658, filed Jul. 6, 2007 and 60/915,729 filed May 3, 2007. The entire disclosures of the above-noted applications are incorporated herein by reference.

BACKGROUND OF THE INVENTION

1. Field of the Invention

The present invention relates to a fluorine-containing elastomer composition prepared using perfluoroelastomers having different contents of a perfluoro(alkyl vinyl ether) unit, and a sealing material made of the composition. The present invention also relates to curable compositions and the molded articles of perfluoroelastomers (FFKM) having excellent thermal and plasma resistance.

2. Description of Related Art

Fluorine-containing elastomers, particularly perfluoroelastomers mainly comprising tetrafluoroethylene (TFE) unit exhibit excellent chemical resistance, solvent resistance and heat resistance, and therefore are widely used for a sealing material, etc. used under strict environments.

However with advances in technologies, the characteristics required have been made more rigorous, and in the fields of aeronautics, space industries, semiconductor manufacturing equipment and chemical plant, sealing property under a high temperature environment of not less than 300° C. is demanded.

Accordingly, for improving the curing speed, Japanese Patent Document JP2001-504885A discloses a curable composition prepared by adding a curing accelerator such as an organic or inorganic ammonium salt to a mixture of a perfluoro elastomer and a curing agent.

Perfluoroelastomeric materials are known for their chemical resistance, plasma resistance, and when used in compositions having typical filler or reinforcing systems for acceptable compression set resistance levels and mechanical properties. As such, they have been applied for many uses, including for use as elastomeric sealing materials in applications where a seal or gasket will be subject to highly corrosive chemicals and/or extreme operating conditions, and for use in forming molded parts that are capable of withstanding deformation. FFKMs are also well known for use in the semiconductor manufacturing industry as sealing materials due to their chemical and plasma resistance. Such materials are typically prepared from perfluorinated monomers, including at least one perfluorinated cure site monomer. The monomers are polymerized to form a perfluorinated polymer having the cure sites from the cure site monomer(s) and then cured (cross-linked) to form an elastomer. Typical FFKM compositions include a polymerized perfluoropolymer as noted above, a curing agent that reacts with the reactive cure site group on the cure site monomer, and any desired fillers. The cured perfluoroelastomer exhibits typical elastomeric characteristics.

FFKMs are generally known for use as O-rings and related sealing parts for high-end sealing applications due to their high purity, excellent resistance to heat, plasma, chemicals and other harsh environments. Industries that require their use in such environments include semiconductor, aerospace, chemical and pharmaceutical. The development of new perfluoroelastomer compositions using these materials faces ever-increasing demands and challenges for FFKMs and compositions based on FFKMs that have the ability to provide greater thermal, chemical and plasma resistance. Industry demands, particularly in the semiconductor area continue to require enhanced performance of such seals to meet new end-use applications that have increasingly aggressive environments as well as lower and lower contamination and particulation requirements.

As is recognized in the art, different FFKM compositions may include different curatives (curing agents) depending on the type of cure site monomer (CSM) structure and corresponding curing chemistry. Such compositions may also include a variety of fillers and combinations of fillers to achieve target mechanical properties, compression set or improved chemical and plasma resistance. For semiconductor sealing applications, both inorganic and organic fillers can be used to improve plasma resistance depending on the type of plasma chemistry. Typical fillers include carbon black, silica, alumina, fluoroplastics, barium sulfate and other plastics. Fillers used in some FFKM compositions for semiconductor applications include fluoroplastic filler particles formed of polytetrafluoroethylene (PTFE) or melt-processible perfluorinated copolymers such as copolymers of tetrafluoroethylene (TFE) and hexafluoropropylene (HFP) (also referred to as FEP-type copolymers) or of TFE and perfluoroalkylvinyl ethers (PAVEs) (known as PFA-type copolymers), particularly in nanomer-sized particles.

U.S. Pat. No. 6,710,132 discloses a blend of an FFKM with semi-crystalline fluoroplastic particles (such as PTFE), wherein the particles have a core-shell structure and are formed by latex blending of these materials.

U.S. Pat. No. 4,713,418 discloses a composition formed by melt blending an FFKM and a melt-processible thermoplastic fluoropolymer. The patent asserts that particles of about 10 microns are reformed from some of the melted thermoplastic upon recrystallization. U.S. Patent Publication No. 2005/0261431 A1 discloses melt blending an FFKM and a semicrystalline polymer such as PTFE and/or a copolymer, such as the PFA-type copolymer, of greater than an average size of 100 nm wherein blending temperature or curing temperature exceeds the melting temperature of the fluoroplastic fillers.

U.S. Pat. No. 7,019,083 and International Publication WO2006/120882 A1 disclose crosslinkable fluoroplastics.

When an FFKM composition includes a semicrystalline fluoroplastic particle filler, such as microparticles or nanoparticles of PTFE or copolymers such as those of the PFA-type, good physical properties, good plasma resistance and excellent purity are achieved. For semiconductor applications, such systems also help to avoid metallic particulation and contamination at a level improved over FFKMs, which have inorganic fillers such as metal oxides. However, there is a need in the art to develop more simplified processing methods to form fluoropolymer-filled FFKMs. Latex blending can be expensive for large-scale, commercial batches and melt blending generally requires temperatures of up to 350° C. Filler loading in many commercial products is generally limited to up to about 30 weight percent of the base polymer. Due to the use of the fluoropolymeric fillers, such compositions can also sometimes have a relatively high compression set especially at high temperatures (e.g., >300° C.). Moldability and bondability can also be limited due to use of such fluoropolymeric fillers.

There is a need in the art for further improvements to perfluoroelastomer compositions which, upon cure, provide high thermal resistance, low compression set, good plasma resistance, relatively low hardness, sufficient strength and elongation which meet the increasingly demanding requirements for use in high-end sealing applications like those of semiconductor processing.

BRIEF SUMMARY OF THE INVENTION

Problem to be Solved by the Invention

It is an object of the present invention to provide a fluorine-containing elastomer composition assuring a short crosslinking time.

The Means to Solve the Problem

In the present invention, attention was directed to a problem that a crosslinking time is longer when a perfluoroelastomer having a small content of a perfluoroalkylvinyl ether unit is used.

Namely, the present invention relates to a fluorine-containing elastomer composition comprising perfluoroelastomers (A) having a tetrafluoroethylene unit, a perfluoroalkylvinyl ether unit (a) and a monomer unit (b) having at least one kind selected from the group consisting of a nitrile group, a carboxyl group and an alkoxycarbonyl group, wherein the composition comprises two or more kinds of perfluoroelastomers (A) having different contents of the perfluoroalkylvinyl ether unit (a).

It is preferable that in two or more kinds of perfluoro elastomers (A), a difference in the content of perfluoroalkylvinyl ether unit (a) between any two kinds of perfluoroelastomers (A) is 5 to 25% by mole.

The monomer unit (b) is preferably a nitrile group-containing monomer unit.

The perfluoroalkyl vinyl ether unit (a) is preferably a perfluoromethyl vinyl ether unit.

It is preferable that the fluorine-containing elastomer composition further comprises a crosslinking agent (B) being crosslinkable with at least one kind selected from the group consisting of a nitrile group, a carboxyl group and an alkoxycarbonyl group of the monomer unit (b).

An amount of the crosslinking agent (B) is preferably 0.3 to 10.0 parts by mass based on 100 parts by mass of the whole perfluoro elastomers.

The crosslinking agent (B) is preferably a compound containing at least two crosslinkable reaction groups represented by the formula (II):

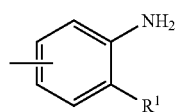
(II)

wherein $R^1$ are the same or different and each is —$NH_2$, —$NHR_2$, —OH or —SH; $R^2$ is a monovalent organic group, a compound represented by the formula (III):

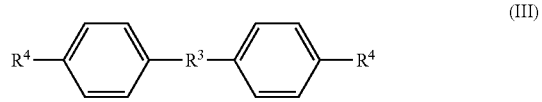
(III)

wherein $R^3$ is —$SO_2$—, —O—, —CO—, an alkylene group having 1 to 6 carbon atoms, a perfluoroalkylene group having 1 to 10 carbon atoms or a single bond; $R^4$ is

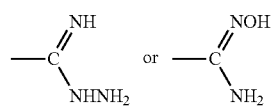

a compound represented by Formula (IV):

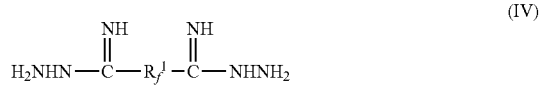
(IV)

wherein $R_f^1$ is a perfluoroalkylene group having 1 to 10 carbon atoms, and a compound represented by the formula (V):

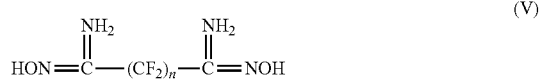
(V)

in which n is an integer of 1 to 10.

The present invention also relates to a sealing material for semiconductor manufacturing equipment made of the above-mentioned fluorine-containing elastomer composition.

The effect of the invention is that the present invention can provide an elastomer composition for crosslinking which assures a short crosslinking time and gives a crosslinked rubber molded article.

Described herein is a fluorine-containing elastomer composition which includes a first curable perfluoropolymer comprising tetrafluoroethylene, a first perfluoroalkylvinyl ether and at least one first cure site monomer having at least one functional group selected from the group consisting of nitrile, carboxyl and alkoxycarbonyl, and a second curable perfluoropolymer comprising tetrafluoroethylene, a second perfluoroalkylvinyl ether and at least one second cure site monomer having at least one functional group selected from the group consisting of nitrile, carboxyl and alkoxycarbonyl, wherein the content of the first perfluoroalkylvinyl ether in the first curable perfluoropolymer and the content of the second perfluoroalkylvinyl ether in the second curable perfluoropolymer are different.

The fluorine-containing elastomer composition may include at least one additional curable perfluoropolymer comprising tetrafluoroethylene, a perfluoroalkylvinyl ether and a cure site monomer.

Further, in preferred embodiments, the content of the first perfluoroalkylvinyl ether in the first curable perfluoropolymer differs from the content of the second perfluoroalkylvinyl ether in the second curable perfluoropolymer by about 5 to about 25 molar percent.

The functional group of the first cure site monomer and/or the functional group of the second cure site monomer in the fluorine-containing elastomer composition is preferably a nitrile group and the first perfluoroalkylvinyl ether and/or the second perfluoroalkylvinyl ether is preferably perfluoromethylvinyl ether.

A curing agent may be provided to the fluorine-containing elastomer composition which curing agent is capable of crosslinking with the functional group of the first cure site monomer and/or the functional group of the second cure site monomer. It may be added in an amount of the curing agent of about 0.3 to about 10.0 parts by weight per 100 parts by weight of the first curable perfluoropolymer and the second curable perfluoropolymer combined.

The curing agent may be selected from various compounds, such as a compound having at least two crosslinkable reaction groups according to formula (II):

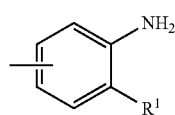
(II)

wherein each $R^1$ group is the same or different and each is selected from $-NH_2$, $-NHR^2$, $-OH$ or $-SH$, wherein $R^2$ is a monovalent organic group;

a compound according to formula (III)

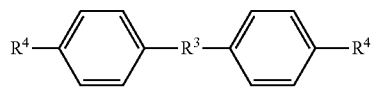
(III)

wherein $R^3$ is $-SO_2-$, $-O-$, $-CO-$, an alkylene group of from 1 to about 6 carbon atoms, a perfluorinated alkylene group of from 1 to about 10 carbon atoms or a single bond, wherein $R^4$ is

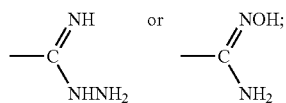

a compound according to formula (IV):

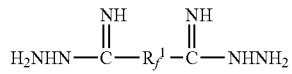
(IV)

wherein $R_f^1$ is a perfluoroalkylene group of 1 to about 10 carbon atoms; and a compound according to formula (V):

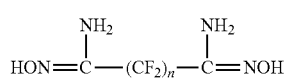
(V)

wherein n is an integer of 1 to about 10.

The invention may include a sealing material for use in semiconductor manufacturing equipment made using the fluorine-containing elastomer composition as noted above.

The invention further includes a curable perfluoroelastomeric composition comprising: a first curable perfluoropolymer comprising tetrafluoroethylene, a first perfluoroalkylvinyl ether and at least one first cure site monomer having a cure site, wherein a molar ratio of the tetrafluoroethylene to the perfluoroalkylvinyl ether is about 0:100 to about 65:35 molar percentage in the perfluoropolymer; a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether is about 65:35 to about 95:5 in the polymer; and at least one curative capable of curing the at least one first cure site monomer and the at least one second cure site monomer.

In one embodiment, in the curable composition first curable perfluoropolymer comprises about 0 to about 58.5 mole percent of the tetrafluoroethylene, about 31.5 percent to about 99.99 mole percent of the first perfluoroalkylvinyl ether and about 0.1 mole percent to about 10 mole percent of the at least one first cure site monomer and the second curable perfluoropolymer comprises about 65 to about 85.5 mole percent of the tetrafluoroethylene, about 4.5 mole percent to about 35 mole percent of the second perfluoroalkylvinyl ether and about 0.1 mole percent to about 10 mole percent of the at least one second cure site monomer.

The invention also includes a cured perfluoroelastomeric composition, comprising: a first perfluoroelastomer formed from a first curable perfluoropolymer comprising tetrafluoroethylene, a first perfluoroalkylvinyl ether and at least one first cure site monomer having a cure site, wherein a molar ratio of the tetrafluoroethylene to the perfluoroalkylvinyl ether is about 0:100 to about 65:35 molar percentage in the perfluoropolymer; and a second perfluoroelastomer foamed from a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether is about 65:35 to about 95:5 in the second curable perfluoropolymer.

The invention also includes molded articles comprising a cured perfluoroelastomeric composition, wherein the composition comprises a first perfluoroelastomer formed from a first curable perfluoropolymer comprising tetrafluoroethylene, a first perfluoroalkylvinyl ether and at least one first cure site monomer having a cure site, wherein a molar ratio of the tetrafluoroethylene to the first perfluoroalkylvinyl ether in the first curable perfluoropolymer is about 0:100 to about 65:35; and a second perfluoroelastomer formed from a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether in the second curable polymer is about 65:35 to about 95:5.

Such molded articles herein may be sealing members that can be bonded to a surface comprising a metal or a metal alloy such as to a surface of a door for sealing a semiconductor processing chamber or other reaction chamber.

The invention further includes a method for making a cured perfluoroelastomeric composition comprising: (a) preparing a curable perfluoroelastomeric composition by combining: (i) a first curable perfluoropolymer comprising tetrafluoroethylene, a first perfluoroalkyl vinyl ether and at least one first cure site monomer having a cure site, wherein a molar ratio of the tetrafluoroethylene to the first perfluoroalkyl vinyl ether is about 0:100 to about 65:35 in the perfluoropolymer; (ii) a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether is about 65:35 to about 95:5 in the polymer; and (iii) at least one curative capable of curing the cure site of the at least one first cure site monomer and the cure site of the at least one second cure site monomer; and (b) curing the first and second curable perfluoropolymers in the perfluoroelastomeric composition to form a cured perfluoroelastomeric composition. Such molded articles herein may be sealing members that can be bonded to a surface comprising a metal or a metal alloy such as to a surface of a door for sealing a semiconductor processing chamber or other reaction chamber.

DETAILED DESCRIPTION OF THE INVENTION

New perfluoroelastomer compositions, and/or molded articles made therefrom such as sealing members including O-rings, seals, gaskets and the like as described herein provide required chemical and plasma resistance, and more particularly provide excellent levels of high-temperature resistance and plasma resistance for such molded articles, particularly when exposed to remote $NF_3$ plasma. Molded articles made in accordance with the curable and cured compositions herein have the characteristics suitable for use in semiconductor plasma and gas chemical vapor deposition (CVD) applications including high density plasma CVD (HDPCVD), plasma-enhanced CVD (PECVD) and atomic layer deposition (ALD) and plasma-enhanced atomic layer deposition (PEALD). From processing and performance perspectives, the curable and cured compositions described herein provide articles that perform equivalent to or better than various prior art filled FFKM compositions which incorporate semicrystalline fluoroplastics as particulate fillers as described in the Background hereof.

The perfluoroelastomer compositions may have two or more types of perfluoroelastomers, least two of which, have varying perfluoroalkylvinyl ether (PAVE) monomer content. The difference in content, measured in percent by mole, between any two such differing PAVE-content perfluoroelastomers in the compositions is preferably from about 5% to about 25%.

In addition, compositions herein are directed to achieving shorter perfluoroelastomer crosslinking times when using a perfluoroelastomer in the composition, which has a generally lower content of PAVE than, is normally used in such compositions.

As used in this application, "perfluoroelastomer" or "cured perfluoroelastomer" unless otherwise indicated, includes any cured elastomeric material or composition that is formed by curing a curable perfluoropolymer(s) such as the curable perfluoropolymers in the curable perfluoroelastomeric compositions described herein. A "curable perfluoropolymer" (sometimes referred to in the art as a "perfluoroelastomer" or more appropriately a "perfluoroelastomer gum") that may be used to form a cured perfluoroelastomer is a polymer that is substantially completely fluorinated, which is preferably completely perfluorinated on its polymeric backbone. It will be understood, based on this disclosure, that some residual hydrogen may be present in some perfluoroelastomers within the crosslinks of those materials due to use of hydrogen as part of a functional crosslinking group. Cured materials, such as perfluoroelastomers are generally cross-linked polymeric structures.

The curable perfluoropolymers that are used in perfluoroelastomeric compositions to form cured perfluoroelastomers upon cure are formed by polymerizing one or more perfluorinated monomers, one of which is preferably a perfluorinated cure site monomer having a functional group to permit curing, wherein the functional group includes a reactive group that may not be perfluorinated. Two or more perfluoropolymers, and preferably at least one curing agent, are combined in a perfluoroelastomeric composition that is then cured forming the resulting crosslinked, cured perfluoroelastomeric compositions as described herein.

As used herein, a "perfluoroelastomeric composition" is a polymeric composition including one or more, and preferably more than one curable perfluoropolymers, each of which is formed by polymerizing two or more perfluorinated monomers, including at least one perfluorinated monomer which has at least one functional group to curing, i.e. at least one cure site monomer. Such materials are also referred to generally as FFKMs in accordance with the American Standardized Testing Methods (ASTM) standardized rubber definitions and as described further herein.

As used herein, "compression set" refers to the propensity of an elastomeric material to remain distorted and not return to its original shape after a deforming compressive load has been removed. The compression set value is expressed as a percentage of the original deflection that the material fails to recover. For example, a compression set value of 0% indicates that a material completely returns to its original shape after removal of a deforming compressive load. Conversely, a compression set value of 100% indicates that a material does not recover at all from an applied deforming compressive load. A compression set value of 30% signifies that 70% of the original deflection has been recovered. Higher compression set values generally indicate a potential for seal leakage and so compression set values of 30% or less are preferred in the sealing arts.

As described herein, the invention includes a preferred curable perfluoroelastomeric composition, cured perfluoroelastomer compositions and molded articles formed from the same.

Such perfluoroelastomeric compositions preferably include two or more perfluorinated copolymers, at least one of which perfluorinated copolymers has a higher content of tetrafluoroethylene (TFE) than a second polymer in the composition. Other suitable co-monomers may include other ethylenically unsaturated fluoromonomers. Each such polymer also has one or more perfluoroalkylvinyl ethers (PAVEs), which include alkyl or alkoxy groups that may be straight or branched and which may also include ether linkages, wherein preferred PAVEs for use herein include, for example, perfluoromethylvinyl ether (PMVE), perfluoroethylvinyl ether (PEVE), perfluoropropylvinyl ether (PPVE), perfluoromethoxyvinyl ether and other similar compounds, with especially preferred PAVEs being PMVE, PEVE and PPVE, and most preferred being PMVE which provides excellent mechanical strength to resulting articles formed from curing the curable compositions herein. The PAVEs may be used alone or in combinations of the above-noted PAVE types within the curable perfluoropolymers and in the ultimate curable compositions so long as the use is consistent with the invention as described herein.

Preferred perfluoropolymers are co-polymers of TFE, at least one PAVE, and at least one perfluorinated cure site monomer that incorporates a functional group to permit crosslinking of the curable polymer. The cure site monomers may be of a variety of types with preferred cure sites noted herein. While preferred cure sites include those having a nitrogen-containing group, a carboxyl group or an alkylcarbonyl group, other cure sites such as iodine, bromine and other halogenated cures as well as other cure sites known in the art may also be used, particularly if additional curable perfluoropolymers beyond the first and second curable perfluoropolymers are provided to the composition. Consequently, while the disclosure herein provides a variety of preferred curatives (also referred to herein as crosslinking agents, curing agents), if other cure sites known in the art are used, other curatives that are capable of curing such alternative cure sites may also be used. For example, organic peroxide-based curatives and co-curatives may be used with halogenated functional cure site groups.

Exemplary cure site monomers are listed below, most of which are PAVE-based in structure and have a reactive site, although they may vary, are those having the following structure (A):

$$CF_2\!=\!CFO(CF_2CF(CF_3)O)_m(CF_2)_n\!-\!X^1 \qquad (A)$$

wherein m is 0 or an integer from 1 to 5, n is an integer from 1 to 3 and $X^1$ is a nitrogen-containing group, such as nitrile or cyano, a carboxyl group and/or an alkoxycarbonyl group. The functional groups noted herein, such as the nitrogen-containing groups, are the sites for crosslinking. Compounds according to formula (A) may be used alone or in various, optional, combinations thereof. From a crosslinking perspective, it is preferred that the crosslinking functional group is a nitrogen-containing group, preferably a nitrile group.

Further examples of cure site monomers according to formula (A) include formulas (1) through (17) below:

$$CY_2\!=\!CY(CF_2)_n\!-\!X^2 \qquad (1)$$

wherein Y is H or F, n is an integer from 1 to about 8

$$CF_2\!=\!CFCF_2R_f^2\!-\!X^2 \qquad (2)$$

wherein $R_f^2$ is $(\!-\!CF_2)_n\!-\!$, $-\!(OCF_2)_n\!-\!$ and n is 0 or an integer from 1 to about 5

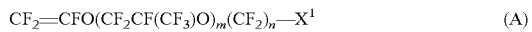
$$(3)$$

wherein m is 0 or an integer from 1 to about 5 and n is 0 or an integer of from 1 to about 5, $$CF_2\!=\!CFCF_2(OCH_2CF_2CF_2)_m(OCF(CF_3)CF_2)_nOCF(CF_2)\!-\!X^2 \qquad (4)$$

wherein m is 0 or an integer from 1 to about 5, and n is 0 or an integer of from 1 to about 5

$$CF_2\!=\!CF(OCF_2CF(CF_3))_mO(CF_2)_n\!-\!X^2 \qquad (5)$$

wherein m is 0 or an integer from 1 to about 5, and n is an integer of from 1 to about 8

$$CF_2\!=\!CF(OCF_2CF(CF_3))_m\!-\!X^2 \qquad (6)$$

wherein m is an integer from 1 to about 5

$$CF_2\!=\!CFOCF_2(CF(CF_3)OCF_2)_nCF(\!-\!X^2)CF_3 \qquad (7)$$

wherein n is an integer from 1 to about 4

$$CF_2\!=\!CFO(CF_2)_nOCF(CF_3)\!-\!X^2 \qquad (8)$$

wherein n is an integer of from 2 to about 5

$$CF_2\!=\!CFO(CF_2)_n\!-\!(C_6H_4)\!-\!X^2 \qquad (9)$$

wherein n is an integer from 1 to about 6

$$CF_2\!=\!CF(OCF_2CF(CF_3))_nOCF_2CF(CF_3)\!-\!X^2 \qquad (10)$$

wherein n is an integer from 1 to about 2

$$CH_2\!=\!CFCF_2O(CF(CF_3)CF_2O)_nCF(CF_3)\!-\!X^2 \qquad (11)$$

wherein n is 0 or an integer from 1 to about 5

$$CF_2\!=\!CFO(CF_2CF(CF_3)O)_m(CF_2)_n\!=\!X^2 \qquad (12)$$

wherein m is 0 or an integer from 1 to about 4 and n is an integer of 1 to about 3

$$CH_2\!=\!CFCF_2OCF(CF_3)OCF(CF_3)\!-\!X^2 \qquad (13)$$

$$CH_2\!=\!CFCF_2OCH_2CF_2\!-\!X^2 \qquad (14)$$

$$CF_2\!=\!CFO(CF_2CF(CF_3)O)_mCF_2CF(CF_3)\!-\!X^2 \qquad (15)$$

wherein m is an integer greater than 0

$$CF_2\!=\!CFOCF(CF_3)CF_2O(CF_2)_n\!-\!X^2 \qquad (16)$$

wherein n is an integer that is at least 1

$$CF_2\!=\!CFOCF_2OCF_2CF(CF_3))OCF_2\!-\!X^2 \qquad (17)$$

wherein $X^2$ can be a monomer reactive site subunit such as a nitrile (—CN), carboxyl (—COOH), or an alkoxycarbonyl group (—COOR$^5$, wherein R$^5$ is an alkyl group of 1 to about 10 carbon atoms which may be fluorinated or perfluorinated), and the like. It is preferred that perfluorinated compounds having no hydrogen atoms are used if excellent heat resistance is desired for the perfluoroelastomer resulting from curing the perfluoropolymers as well as for preventing decrease in molecular weight due to chain transfer when synthesizing the perfluoroelastomer by polymerization reaction. Further, compounds having a CF$_2$=CFO-structure are preferred from the viewpoint of providing excellent polymerization reactivity with TFE.

Suitable cure site monomers preferably include those having nitrogen-containing cure sites such as nitrile or cyano cure sites, for preferred crosslinking reactivity. However, cure sites (having multiple and varied backbones in addition to those noted above) and having carboxyl, COOH and other similar cure sites known in the art and to be developed may also be used. The cure site monomers may be used alone or in varied combinations.

Examples of perfluoropolymers and resulting elastomers formed therefrom using cure site monomers such as those noted above may be found in WO 00/29479 A1, incorporated herein in relevant part with respect to such perfluoroelastomers, their content and methods of making the same. Reference is also made to Japanese Kokai Patents No. H09-512569 A and H11-092529 A.

Perfluoropolymers for use in the compositions claimed herein may be synthesized using any known or to be developed polymerization technique for forming fluorine-containing elastomers using polymerization, including, for example, emulsion polymerization, latex polymerization, chain initiated polymerization, batch polymerization and others. Preferably, the polymerization is undertaken so that reactive cure sites are located either on either or both terminal ends of the polymer backbone and/or are depending from the main polymer backbone.

One possible method of making the polymers includes radical polymerization using an initiator such as those known in the art for polymerization of fluorine-containing elastomers (organic or inorganic peroxide and azo compounds). Typical initiators are persulfates, percarbonates, peresters and the like, with preferred initiators being include salts of persulfuric acid, oxidizing carbonates and esters, and ammonium persulfate, with the most preferred being ammonium persulfate (APS). These initiators may be used alone or with reducing agents, such as sulfites and sulfite salts.

A wide variety of emulsifiers for emulsion polymerization can be used, but preferred are salts of carboxylic acid having a fluorocarbon chain or a fluoropolyether chain, to suppress chain transfer reactions to the emulsifier molecules that occur during polymerization. The amount of emulsifier is generally used in amounts of about 0.05 to 2 weight percent, and preferably 0.2 to 1.5 weight percent, based on the added water. It is noted that a special arrangements should be used to avoid an ignition source, such as sparks, near the polymerization equipment. See, G. H. Kalb, Advanced Chemistry Series, 129, 12 (1973).

Polymerization pressure may vary, and can generally be in the range 0.5 to 7 MPa. The higher the polymerization pressure is, the higher the polymerization rate will be. Accordingly if productivity enhancement is desired, the polymerization pressure is preferably at least 0.7 MPa.

Standard polymerization procedures known in the art may be used. If a nitrogen-containing group, such as nitrile or cyano, a carboxyl group, or an alkoxycarbonyl group is to used in the curable perfluoropolymers herein, it may be included in the polymer by copolymerizing an additional monomer having the crosslinking site containing that group. The cure-site monomer may be added and copolymerized when preparing the fluorine-containing elastomer. A further method for providing such a group to the polymer is by subjecting a polymerization product to an acid treatment to convert a group such as a metallic salt or ammonium salt of a carboxylic acid contained in the polymerization product to a carboxyl group. Examples of a suitable acid treatment method are washing with hydrochloric acid, sulfuric acid, nitric acid or fuming sulfuric acid or by decreasing a pH value of a mixture system after the polymerization reaction to 3 or less by using the above-mentioned acids. Another method for introducing a carboxyl group is by oxidizing a crosslinkable polymer having iodine and bromine, with fuming nitric acid.

Uncured perfluoropolymers are commercially available, including perfluoropolymers sold by Dyneon, Daiel-Perfluor® and other similar polymers, available from Daikin Industries, Ltd. of Osaka, Japan. Other suitable materials are available also from Ausimont S.p.A. in Italy, Asahi Glass, Japan, and W. L. Gore.

Curing agents (also referred to herein as crosslinking agents) for use with various perfluoroelastomer compositions and elastomer-containing compositions of the present invention are for use with various cure sites described herein and should be capable of curing (crosslinkable to) the cure site in the various uncured perfluoropolymers in the compositions. Preferred crosslinking or curing agents are oxazole, imidazole, thiazole, triazine, amidoxime, and amidrazone crosslinking agents. Of these, imidazole is preferred in that crosslinked article providing excellent mechanical strength, heat resistance, chemical resistance, cold resistance is achievable, particularly a cured article which is balanced and excellent with respect to heat resistance and cold resistance.

For preferred nitrogen-containing cure sites include bisphenyl-based curatives and derivatives thereof, including bisaminophenol and its salts, and tetraphenyltin. In addition, the perfluoropolymers may be cured using radiation-curing technology.

Most preferred are cyano-group containing cure sites cured with curatives that are aromatic amines having at least two crosslinkable groups as in formulas (I) and (II) below, or a combination thereof, which form benzoimidazole cross-linking structures upon cure. These curatives are known in the art and discussed in relevant part and with specific examples in U.S. Pat. No. 6,878,778 and U.S. Pat. No. 6,855,774, which are incorporated herein in their entirety.

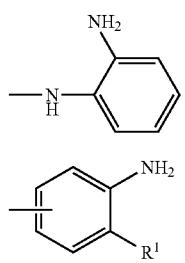

wherein $R^1$ is the same or different in each group according to formula (II) and may be $NH_2$, $NHR^2$, OH, SH or a monovalent organic group or other organic group such as alkyl, alkoxy, aryl, aryloxy, aralkyl and aralkyloxy of from about 1 to about 10 carbon atoms, wherein the non-aryl type groups may be branched or straight chain and substituted or unsubstituted and $R^2$ may be —$NH_2$, —OH, —SH or a monovalent or other organic group such as an aliphatic hydrocarbon group, a phenyl group and a benzyl group, or alkyl, alkoxy, aryl, aryloxy, aralkyl and aralkyloxy groups, wherein each group is from about 1 to about 10 carbon atoms, wherein the non-aryl type groups may be branched or straight chain and substituted or unsubstituted. Preferred monovalent or other organic groups, such as alkyl and alkoxy (or perfluorinated versions thereof) are from 1 to 6 carbon atoms, and preferred aryl type groups are phenyl and benzyl groups. Examples thereof include —$CF_3$, —$C_2F_5$, —$CH_2F$, —$CH_2CF_3$ or —$CH_2C_2F_5$, a phenyl group, a benzyl group; or a phenyl or benzyl group wherein 1 to about 5 of the hydrogen atoms are substituted by fluorine atoms such as —$C_6F_5$, —$CH_2C_6CF_5$, wherein groups may be further substituted, including with —$CF_3$ or other lower perfluoroalkyl groups, or, phenyl or benzyl groups in which 1 to 5 hydrogen atoms are substituted by $CF_3$ such as for example $C_6H_{5-n}(CF_3)_n$, —$CH_2C_6H_{5-n}(CF_3)_n$ (wherein n is from 1 to about 5). Hydrogen atoms may be further substituted with phenyl or benzyl groups. However, a phenyl group and $CH_3$ are preferred as providing superior heat resistance, good cross-linking reactivity and relatively easy synthesis.

A structure having formula (I) or (II) incorporated in an organic amine should include at least two such groups of formula (I) or (II) such that at least two cross-linking reactive groups are provided.

Also useful herein are curatives having formulas (III), (IV) and (V) shown below.

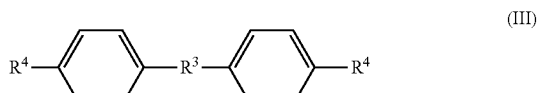

wherein $R^3$ is preferably SO, O or CO or an organic or alkylene type group, such as an alkyl, alkoxy, aryl, aralkyl or aralkoxy group of from one to six carbon atoms or perfluorinated versions of such groups, having from about one to about 10 carbon atoms, and being branched or straight chain, saturated or unsaturated, and branched or straight chain (with respect to the non-aryl type groups) or a single bond. $R^4$ is preferably a reactive side group such as those set forth below:

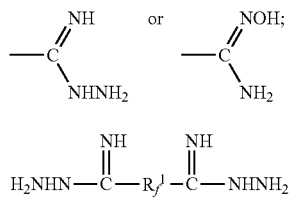

(IV)

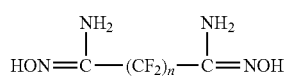

wherein $R_f^1$ is a perfluoroalkyl or perfluoroalkoxy group of from about 1 to about 10 carbon atoms that may be a straight or branched chain group and/or saturated or unsaturated and/or substituted or unsubstituted; and (V)

$$HON=\overset{NH_2}{\underset{}{C}}-(CF_2)_n-\overset{NH_2}{\underset{}{C}}=NOH$$

wherein n is an integer of about 1 to about 10.

With respect to heat resistance, oxazole, imidazole, thiazole and triazine crosslinking agents are preferred and can include the formula compounds listed below and discussed further below with respect to Formulae (I), (II), (III), (IV) and (V), specifically, formula (II) wherein $R^1$ is the same or different and each is —$NH_2$, —$NHR^2$, —OH or —SH, wherein $R^2$ is a monovalent organic group, preferably not hydrogen; formula (III) wherein $R^3$ is —$SO_2$—, —O—, —CO—, and alkylene group of 1 to about 6 carbon atoms, a perfluoroalkylene group of 1 to about 10 carbon atoms or a single bond and $R^4$ is as noted below; formula (IV) wherein $R_f^1$ is a perfluoroalkylene group of 1 to about 10 carbon atoms, and formula (V) wherein n is an integer of 1 to about 10. Of such compounds, those of formula (II) as noted herein are preferred for heat resistance, which is enhanced due to stabilization of the aromatic rings after crosslinking. With respect to $R^1$ in the formula (II), it is preferred also to use —$NHR^2$ as $R^1$, since an N—$R^2$ bond (wherein $R^2$ is a monovalent organic group and not hydrogen) is higher in oxidation resistance than an N—H bond, Compounds having at least two groups as in formula (II) are preferred and having 2 to 3 crosslinkable reactive groups thereon, more preferably having 2 crosslinkable groups.

Exemplary curatives based on the above preferred formulae include at least two functional groups, such as the following structures formula (VI), (VII) or (VIII):

(VI)

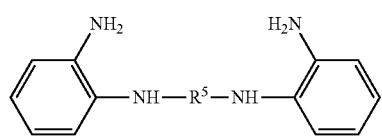

wherein $R^5$ represents a saturated or unsaturated, branched or straight chain, substituted or unsubstituted group such as alkyl, alkoxy, aryl, SO, O, CO, or similar groups which are perfluorinated with respect to the carbon atoms and which is preferably about 1 to about 10 carbon atoms;

(VII)

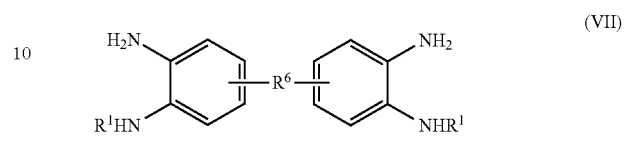

wherein $R^1$ is as defined elsewhere herein and $R^6$ may be O, $SO_2$, CO or an organic group which may be perfluorinated, such as alkyl, alkoxy, aryl, aryloxy, aralkyl and aralkyloxy of from about 1 to about 10 carbon atoms, wherein the non-aryl type groups may be branched or straight chain and substituted or unsubstituted, or a single or alkylene bond.

From the view of easy synthesis, preferred crosslinking agents are compounds having two crosslinkable reactive groups as represented by formula (II) are shown below in formula (VIII).

(VIII)

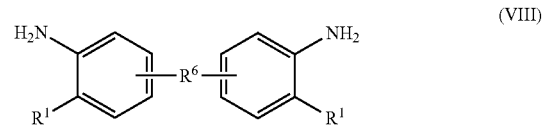

wherein $R^1$ is as above and $R^6$ is —$SO_2$—, —O—, —CO—, an alkylene group of 1 to about 6 carbon atoms, a perfluoroalkylene group of 1 to about 10 carbon atoms, a single bond or a group as shown in Formula (IX):

(IX)

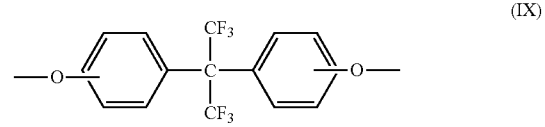

wherein this formula provides an easier the synthesis. Preferred examples of alkylene groups of from 1 to about 6 carbon atoms are methylene, ethylene, propylene, butylene, pentylene, hexylene and the like. Examples of perfluoroalkylene groups of 1 to about 10 carbon atoms are

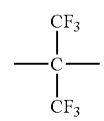

and the like. These compounds are known as examples of bisaminophenyl compounds. See, as a reference for example, the compounds in Japanese Patent No. 2-591177 B and Japanese Kokai Application No. 8-120146 A and similar patents. Preferred compounds according to this structure include those of formula (X):

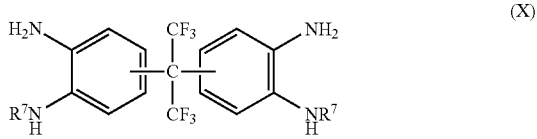

(X)

wherein $R^7$ is the same or different in each instance and each $R^7$ is hydrogen, an alkyl group of 1 to about 10 carbon atoms; a partially fluorinated or perfluorinated alkyl group of 1 to 10 carbon atoms; a phenyl group; a benzyl group; or a phenyl or benzyl group in which 1 to about 5 hydrogen atoms have been replaced by fluorine or a lower alkyl or perfluoroalkyl group such as $CF_3$.

Non-limited examples of curatives include 2,2-bis(2,4-diaminophenylhexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl]hexafluoropropane, 2,2-bis[3-amino-4-(N-benzylamino)phenyl]hexafluoropropane, and similar compounds. Of these, for preferred excellent heat resistance properties, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane and 2,2-bis[3-amino-4-(N-phenylamino)phenyl]hexafluoropropane are preferred. For most preferred excellent heat resistant properties, 2,2-bis[3-amino-4-(N-phenylaminophenyl)]hexafluoropropane is preferred.

Other suitable curatives include oxazole, imidazole, thiazole, triazine, amidoxime and amidrazone crosslinking agents, and particularly bisaminophenols, bisamidines, bisamidoximes, bisamidrazones, mono amidines, monoamidoximes and monoamidrazones as known in the art or to be developed, examples of which are set forth, for example in U.S. Patent Publication No. 2004/0214956 A1, incorporated herein in relevant part by reference, including the curatives and co-curatives and accelerators therein. Imidazoles are useful in that they can provide good mechanical strength, heat resistance, chemical resistance, and low temperature capacity, as well as a good balance of crosslinking properties and high and low temperature properties. The bisamidoxime, bisamidrazone, bisaminophenol, bisaminothiophenol or bis-diaminophenyl curatives can react with nitrile or cyano groups, carboxyl groups, and/or alkoxycarbonyl groups in the perfluoropolymer to preferably form a perfluoroelastomer having an oxazole ring, a thiazole ring, an imidazole ring, or a triazine ring as crosslinks in the resulting cured articles formed from the compositions herein.

It is preferred to have a compound including at least two chemical groups with cross-linking reactive groups as in Formula (I) or (II) in order to increase heat resistance and to stabilize an aromatic ring system. For groups such as in (I) or (II), having two to three such groups, it is preferred to have at least two in each group (I) or (II), as having a lesser number of groups may not provide adequate cross-linking.

In one embodiment, the curable perfluoroelastomeric composition includes at least two curable perfluoropolymers, a first perfluoropolymer and a second perfluoropolymer, which have differing PAVE content, however, it should be understood that additional such perfluoroelastomers may be combined with the first and the second perfluoropolymers, and also have varying amounts of PAVE, provided at least the first and the second perfluoropolymers (and in cured compositions the first and second perfluoroelastomers) have varying PAVE content as discussed herein. It is preferred to use a high-PAVE content curable perfluoropolymer and a low-PAVE content curable perfluoropolymer, alone or in a combination with one or more additional curable perfluoropolymers as use of two PAVEs, which are both low-PAVE content polymers, while beneficial in some ways, contributes to decreasing crosslinking time. However, the better the PAVE differential approaching the optimum ranges described herein, the better and the shorter the crosslinking time will be. Such preferred differential PAVE content also contributes to the easy adjustment of hardness in end products, such as molded articles, formed from the fluorine-containing elastomer compositions.

The first curable perfluoropolymer preferably includes tetrafluoroethylene in an amount of about 0 to about 58.5 mole percent, and preferably 49.8 to about 63.1 mole percent. A first perfluoroalkylvinyl ether (which may include at least one perfluoroalkylvinyl ether which can be used alone or in combination with other perfluoroalkylvinyl ethers), and at least one first cure site monomer having a cure site. The perfluoroalkylvinyl ether is preferably present in the first curable perfluoropolymer in an amount of 31.5 to about 99.99, and preferably about 34 to about 49.75 mole percentage of the perfluoropolymer or about 38 to about 50 mole percent of the polymer. In one embodiment, in a fluorine-containing elastomer composition, the first perfluoropolymer is the high PAVE-content curable perfluoropolymer and the content of PAVE therein is preferably at least about 38% by mole, and more preferably at least about 40% by mole to enhance crosslinking speed of the composition. Corresponding in this embodiment, the PAVE content is preferably no greater than about 50% by mole, more preferably no greater than about 45% by mole and most preferably no greater than bout 42% by mole so as to increase the polymerization rate in synthesizing the polymer.

Most preferably, the first curable perfluoropolymer has a molar percentage ratio of tetrafluoroethylene to the first perfluoroalkylvinyl ether(s) in the polymer chain of about 0:100 to about 65:35, and more preferably from about 50:50 to about 65:35.

The at least one first cure site monomer having a cure site is preferably a single cure site monomer, but combinations of cure site monomers having the same functional active cure group or varying types of cure site monomers having differing cure site groups (as in a dual cure composition) may also be used herein.

The second curable perfluoropolymer preferably includes a higher content of tetrafluoroethylene than the first curable perfluoropolymer, and more preferably about 65 to about 85.5 mole percentage of tetrafluoroethylene, and most preferably about 64.7 to about 82.5 mole percent in the second curable polymer. The second perfluoroalkylvinyl ether in the second curable perfluoropolymer, which is the low-PAVE content perfluoropolymer may also be one or more perfluoroalkylvinyl ethers used alone or in combination, and the second perfluoroalkylvinyl ether(s) may be the same or different from the first perfluoroalkylvinyl ether(s) in the first curable perfluoropolymer. The second perfluoroalkylvinyl ether is preferably present at about 4.5 to about 35 mole percent, and more preferably about 14.6 to about 34.83 mole percent of the second perfluoropolymer.

In one embodiment, in a fluorine-containing elastomer composition, the second curable PAVE is present in the polymer preferably in an amount of at least about 18% by mole, more preferably at least about 21% by mole and most preferably at least about 25% by mole, so as to contribute to a lower glass transition temperature and satisfactory low temperature properties. In that embodiment, the PAVE content is also preferably no greater than about 35% by mole, and more preferably no greater than about 32% by mole and most preferably no greater than about 30% by mole so as to contribute to an increase in hardness of resulting crosslinked articles formed from curing the fluorine-containing elastomer composition and for enhancing sealing properties of such articles.

Most preferably, the second curable perfluoropolymer has a molar percentage ratio in the polymer chain of tetrafluoroethylene to the second perfluoroalkylvinyl ether(s) of about 65:35 to about 95:5, and more preferably about 65:35 to about 85:15.

It is most preferred that the difference in PAVE content in the first curable perfluoropolymer and the second curable perfluoropolymer is at least 5 molar percent to provide adjustment of hardening of the crosslink. It is preferred, however, that the difference in the PAVE content between the first and second curable perfluoropolymers be at least about 8 molar percent, and more preferred that it is at least about 10 molar percent. It is further preferred that the difference in content in PAVE content is less than about 25 molar percent, more preferably less than about 15 molar percent and most preferably less than about 10 molar percent to avoid increases in the glass transition point.

The second curable perfluoropolymer preferably also comprises at least one second cure site monomer having a cure site. The second cure site monomer(s) may be the same or different from the at least one first cure site monomer(s) used in the first curable perfluoropolymer, although it is preferred that the first and second cure site monomer(s) are either of the same type (meaning that they are the same or have the same cure site functional group(s)) or are capable of being cured by the same curative for convenience and compatibility. Although it should be understood by those skilled in the art, based on this disclosure that dual cure materials may be used, or varying cures between the first and second curable polymers within the scope of the invention, provided that preferably adequate curing is obtained through use of the appropriate curatives.

In both the first curable perfluoropolymer and second perfluoropolymer, the polymers preferably include the cure site monomer(s) in amounts of about 0.01 to about 10 molar percentage of the polymer chains, and more preferably about 0.05 to about 3 molar percent. While various cure site functional groups may be used within the scope of the invention, it is preferred that the cure sites of the at least one first and at least one second cure site monomers each is a functional group that is a nitrogen-containing group such as nitrile, a carboxyl group or an alkoxycarbonyl group. The monomers may be configured so that the first and/or the second cure site monomer(s) provide a functional group such as a nitrogen-containing group on one or two of the terminal ends of the first or second curable perfluoropolymer, respectively. Alternatively, or in additional to terminal end placement of groups, such cure site groups having nitrogen may also be situated so as to depend from the polymer backbone of either the first and/or the second curable perfluoropolymer.

In one preferred embodiment, in a fluorine-containing elastomer composition, the content of the at least one cure site monomer is at least about 0.1% by mole, more preferably at least about 0.2% by mole and most preferably at least about 0.3% by mole in order to provide enhanced crosslinkability. Further, in such embodiment, the at least one cure site monomer is no greater than about 2.0% by mole, more preferably no greater than about 1.0% by mole and most preferably no greater than about 0.5% by mole to avoid use of excessive cure site monomer due to expense associated therewith.

The curable perfluoropolymer compositions described herein are preferably a combination of two curable perfluoropolymers, but the invention may also include within its scope the addition of further such curable perfluoropolymers without departing from the spirit of the invention.

In addition to the curable perfluoropolymers described above, the curable perfluoroelastomer composition preferably also includes at least one curative(s) which is/are capable of curing the at least one first cure site monomer and the at least one second cure site monomer. Preferably, if a functional-group containing cure site is used in the first and/or the second curable perfluoropolymer, the at least one curative is selected so as to react with the functional group(s) of the cure site monomer(s) in order to form cross-linking structures such as benzoimidazole cross-linking structures. Suitable curatives are as noted elsewhere herein and are included in the curable perfluoroelastomeric composition in amounts of about 0.3 to about 10 parts by weight per hundred parts of the curable composition based on the total weight of the first and the second curable perfluoropolymers (or total curable perfluoropolymers), and more preferably about 0.6 to about 0.9 parts by weight per hundred parts of the curable perfluoroelastomeric composition thereof. The preferred range is most beneficial to provide good strength characteristics and to avoid cracking or structural defects when under high-temperature compression forces. It also provides preferred compression set characteristics.

In one embodiment of the fluorine-containing elastomers herein, the curative is one of those listed as preferred above, and is present in an amount by weight of at least about 0.3 parts by weight, and more preferably at least about 0.5 parts by weight or at least about 0.7 parts by weight, and most preferably at least about 0.6 parts by weight based on 100 parts by weight of elastomer in the composition, with greater amounts enhancing crosslinking. The curative or crosslinking agent is preferably no greater than 10.0 parts by weight, and more preferably no greater than 2.0 parts by weight and most preferably no greater than 0.9 parts by weight based on 100 parts by weight of the elastomers in the composition.

In addition to the preferred curatives noted herein for use with fluorine-containing curable perfluoropolymers having nitrile groups and the like, it is within the scope of the invention to cure the nitrile groups using curatives known in the art for the first and second perfluoropolymers and/or for other perfluoropolymers added to the compositions herein. Examples of other curatives known in the art include organotins such as tetraphenyltin, triphenyltin and the like (as these compounds form preferred triazine rings). If an organotin compound is used, it is preferred to be present in an amount of about 0.05 to about 10 parts by weight, more preferably about 1 to about 5 parts by weight, based on 100 parts by weight of the curable perfluoropolymers in the composition. If the organotin is present in an amount of less than about 0.05 parts, there is a tendency for the polymer to not sufficiently crosslink upon curing and if the amount is more than about 10 parts, physical properties of the formed articles tend to deteriorate.

In addition to the above-described curable perfluoroelastomeric composition, described herein are cured perfluoroelastomeric composition includes at least a first cured perfluoroelastomer and a second cured perfluoroelastomers, which cured elastomers are formed from the at least two, and preferably only two of the above-described curable perfluoropolymers in the composition after the cure is complete such that the curative(s) in the curable perfluoroelastomeric composition has/have been substantially reacted and incorporated into the cross-linked cured perfluoroelastomeric composition.

It is within the scope of the invention to combine these curable materials in varying amounts so that the weight percentage ratio of the first perfluoroelastomer to the second perfluoroelastomer in the composition is about 1:99 to about 99:1, more preferably about 20:80 to about 80:20, and most preferably about 75:25 to about 45:55.

Such cured perfluoroelastomer compositions formed from curable perfluoroelastomeric compositions as noted herein may be cured and shaped so as to form a molded article(s). Generally, the molded articles will be formed as sealing members such as O-rings, seals, gaskets, inserts and the like, but other shapes and uses known or to be developed in the art are contemplated herein.

The molded article may be bonded to a surface for forming, for example, bonded seals. Such bonded seals may be used, for example for forming pre-bonded doors, gates, and slit valve doors for use, e.g., in semiconductor processing. The surfaces to which such molded articles, such as seals may be bonded include polymeric surfaces as well as metal and metal alloy surfaces. In one embodiment, the invention includes a gate or slit valve door formed of, e.g., stainless steel or aluminum, to which an O-ring seal conforming to a recess in the door configured for receiving the seal. The bonding may occur through use of a bonding composition or through an adhesive. Further, a bonding agent may be prepared which is formed of a fluorosolvent, such as one of several Fluorinert® solvents from 3M capable of dissolving a perfluoropolymer, at least one curable perfluoropolymer and a curative.

The bonding agent may be applied to the O-ring or the recess of the door either after initial curing of an extruded polymer in a mold for making an O-ring and prior to bonding the seal to a surface such as a door, or the bonding agent can be applied to an extruded polymer which can be molded and cured in situ in the surface (door) to which it is to be bonded so that upon heat curing, the perfluoropolymers are cured in the O-ring and also within the bonding agent at the same time. Preferably, although not necessarily, the perfluoropolymer used in the bonding agent is the same as at least one of the perfluoropolymers in the perfluoroelastomer compositions described herein. The bonding agent may also preferably include both perfluoropolymers used in the curable perfluoroelastomeric compositions described herein and/or can be useful using any suitable curable perfluoropolymer capable of curing to bond the compositions to the intended surface.

Also described herein is a method for making a cured perfluoroelastomeric composition as described hereinabove. In the method, a curable perfluoroelastomeric composition is prepared by combining at least two curable perfluoropolymers as described elsewhere herein as a first and a second perfluoropolymer and at least one curative capable of curing the cure site of the at least one first and second cure site monomer(s).

The polymers may be combined using typical rubber processing equipment such as an open roll, Banbury mixer, kneader or the like. The compositions may also be prepared using a method of a closed mixer and a method of coagulation through emulsion mixing. Preferably a typical mixer, such as a two-roll mixer as is typically used for combining perfluoropolymers (also referred to as perfluoroelastomer gum). Preferably, in this method, the polymers are mixed at room temperatures, or at elevated temperatures of about 30° C. to about 100° C., and preferably about 50° C.

If desired, additives may also be admixed into the composition at this point. Additives are optional and not required due to the unique nature of the interaction of the first and second curable perfluoropolymers. However, if desired to alter certain properties, cure accelerators, co-curatives, co-agents, processing aids, plasticizers, fillers and modifiers such as silica, fluoropolymers (TFE and its melt-processible copolymers as well as core-shell modified fluoropolymers as are known in the art in micropowder, pellet, fiber and nanopowder forms), fluorographite, silica, barium sulfate, carbon, carbon black, carbon fluoride, clay, talc, metallic fillers (titanium oxide, aluminum oxide, yttrium oxide, silicon oxide), metal carbides (silicon carbide, aluminum carbide), metallic nitrides (silicon nitride, aluminum nitride), other inorganic fillers (aluminum fluoride, carbon fluoride), colorants, organic dyes and/or pigments, such as azo, isoindolenone, quinacridone, diketopyrrolopyrrole, anthraquinone, and the like, imide fillers (such as polyimide, polyamide-imide and polyetherimide), ketone plastics (such as polyarylene ketones like PEEK, PEK and PEKK), polyarylates, polysulfones, polyethersulfones, polyphenylene sulfides, polyoxybenzoate, and the like may be used in amounts known in the art and/or which may be varied for different properties. All of the fillers herein may be used alone or in combinations of two or more such fillers and additives.

Preferably, any optional fillers used total less than about 30 parts per hundred parts of the combined curable perfluoropolymers in the composition. Organic fillers, providing heat resistance, and plasma resistance (reduced numbers of particles and low weight reduction rates at emission of plasma), include of those mentioned above, organic pigments, imide fillers with imide structures such as polyimide, polyamide imide and polyetherimide, and ketone-based engineering plastics like PEEK, and PEK, with organic pigments being preferred.

Pigmented fillers which are preferred for heat resistance and chemical resistance and having less effect on end characteristics of the molded articles formed from the compositions described herein include quinacridone, diketopyrrolopyrrole and anthraquinone pigments and dyes, with quinacridone being preferred.

Of the inorganic fillers, preferred fillers for shielding plasma effects include aluminum oxide, yttrium oxide, silicon oxide, polyimide and carbon fluoride.

After the polymers are combined, the first and second curable perfluoropolymers in the perfluoroelastomeric composition are cured to form a cured perfluoroelastomeric composition as described herein.

Depending on the cure sites and curative, various cross-link structures can be formed upon curing. Preferably, functional cure groups are used on the cure site monomers, so that the cured perfluoroelastomeric composition includes a curative(s) which form benzoimidazole cross-linking structures.

The curable perfluoroelastomeric composition is preferably cured at temperatures and for times sufficient to allow the curing reaction to proceed until the curable perfluoropolymers in the composition are substantially cured, preferably at least 70% cured. Preferred curing temperatures and times are about 150° C. to about 250° C., for about 5 to about 40 minutes. Following curing, an optional postcure may be used. Acceptable postcure temperatures and times are about 250° C. to about 320° C. for about 5 to about 48 hours.

While curing, the curable perfluoroelastomeric compositions described herein can be formed into a molded article while simultaneously curing using heat and pressure applied by to a mold. Preferably, the combined curable perfluoropolymers are formed into a preform, such as an extruded rope or other shape useful for including the preform in a mold having a recess shaped to receive the preform and for forming a molded article while curing.

In addition to fillers, it is within the scope of the invention to include additional curable and noncurable perfluoropolymers having varied types, including the same or different cure site monomers to those preferred herein. Additional curatives and cure accelerators, either to work with or accelerate the cure of the first perfluoropolymer and/or the second perfluoropolymer or to cure and/or accelerate cure of any additional optional curable perfluoropolymers may also be included herein. Noncurable perfluoropolymers include those which lack a reactive cure site and are formed from one or more ethylenically unsaturated monomers (such as TFE, HFP and PAVE). Additional curable perfluoropolymers may be any of the curable perfluoropolymers noted herein as well as those having cure sites suitable for crosslinking with organic peroxide cure systems as are known in the art, tetraphenyl tin cures, bisaminophenyl-based cures and the like. Such polymers may be added to develop alternative blends and to modify the properties of the compositions noted herein.

The perfluoroelastomers of the invention are alternatives to and in some generally show improved properties in comparison to semicrystalline fluoroplastic-filled FFKM compositions as used in the prior art. The compositions can be made without additional use of such fluoroplastic particle fillers and without the need for high temperature mixing. The higher TFE content of the second polymer while allowing the cured perfluoropolymer in the composition to remain amorphous, changes the nature of the other perfluoropolymer such that the higher TFE content perfluoropolymer acts in the role of a "filler" in the other curable perfluoropolymer. Thus, the molded articles produced by the elastomeric compositions of the present invention are more resilient to cracking under harsh chemical, thermal and plasma conditions.

In contrast to the prior art, the compositions of the present invention produce an FFKM blend at a molecular level that results in desired properties for intended uses without the need for additional fillers. Further, in contrast to the prior art, the composition of the present invention, because it does not require a semicrystalline polymer component and remains in an amorphous state if unfilled, can be easily processed.

As discussed, the amorphous, high-TFE curable perfluoropolymer in the composition is believed on theory to be instrumental to achieving desired properties of the resultant perfluoroelastomeric composition. The mole percentage of TFE in the high TFE-content curable perfluoropolymer in the composition should not exceed about 95%, and particularly should avoid approaching the crystalline point where a melting point would be discernible. The crosslinked elastomeric compositions and molded articles prepared therefrom display excellent thermal resistance with very low compression set. In addition, due to their high purity and excellent plasma resistance, they can be used for semiconductor sealing applications.

The hardness of preferred cross-linked perfluoroelastomer compositions described herein may be from about 40 to about 95 Shore A hardness, but is preferably at least about 50 Shore A, and more preferably at least about 55 Shore A, and most preferably at least about 60 Shore A. It is further preferred that hardness is no greater than about 95 Shore A, more preferred that it is no greater than about 90 Shore A and most preferred that it is no greater than about 85 Shore A. Such preferred hardness values provide more and increasingly superior sealing characteristics.

The resulting cured perfluoroelastomer compositions described herein also have superior chemical resistance, plasma resistance, good mechanical strength and heat resistance. It is also possible to adjust the hardness levels of the resulting perfluoroelastomer composition, with or without use of fillers, by using varying combinations of the perfluoropolymers noted herein. The outgassing component released from the resulting perfluoroelastomer compositions may also be reduced thereby assisting in avoidance of environmental pollution. It is also, therefore, useful for sealing semiconductor equipment, as an O-ring, square ring, corner ring, gasket, packing, oil seal, pairing seal, lip seal, door seal and the like. Such seals and related gasketing products can be used in various types of semiconductor processing equipment for providing semiconductor products having higher demands in manufacture and clarity, such as liquid crystal or plasma panel displays.

Exemplary equipment in which sealing products formed from the perfluoropolymer compositions herein may be used include etching equipment, such as dry-etching, plasma-etching, reactive ion-etching, reactive ion beam-etching, sputter-etching, ion beam etching, wet etching and ashing equipment; cleaning apparatuses such as dry-etching cleaning, $UV/O_3$ cleaning, ion beam cleaning, laser beam cleaning, plasma cleaning and gas etching cleaning apparatuses; extractor cleaning apparatuses, such as Soxhlet extraction cleaning, high-temperature, high-pressure extractor cleaning, microwave extractor cleaning, and supercritical extractor cleaning apparatuses; exposure devices such as steppers and coater developers; polishing apparatuses such as CMP equipment; coating equipment such as CVD and sputtering equipment; and diffusion—ion implantation equipment such as oxidation diffusion equipment and ion implantation equipment.

In one preferred best mode embodiment, the present invention relates to a fluorine-containing elastomer composition comprising two or more kinds of perfluoroelastomers, referred to herein as perfluoroelastomers (A), having different contents of a perfluoroalkylvinyl ether (PAVE) unit (a).

In the two or more kinds of perfluoroelastomers (A), there is a difference in the content of PAVE unit (a) between any two kinds of perfluoroelastomers (A) that is preferably not less than 5% by mole, more preferably not less than 8% by mole, further preferably not less than 10% by mole, from the viewpoint of easy adjustment of hardness of a crosslinked article. In addition, the difference in a content of the PAVE unit (a) in each kind of perfluoroelastomer (A) is preferably not more than 25% by mole, more preferably not more than 20% by mole, further preferably not more than 15% by mole, in that a glass transition temperature of the perfluoroelastomer having a smaller content of PAVE unit (a) is not elevated.

In addition, in this embodiment, in any two kinds of perfluoro elastomers (A) among two or more kinds of perfluoroelastomers (A), assuming that the perfluoroelastomer having the larger content of PAVE unit (a) is referred to as a perfluoroelastomer (A1) and the perfluoroelastomer having the smaller content of PAVE unit (a) is referred to as a perfluoroelastomer (A2), the content of PAVE unit (a) in the perfluoroelastomer (A1) is preferably not less than 38% by mole, more preferably not less than 40% by mole, in that a crosslinking speed of the composition is faster. Also the content of PAVE in the perfluoroelastomer (A1) is preferably not more than 50% by mole, more preferably not more than 45% by mole, further preferably not more than 42% by mole, in that a polymerization rate in synthesizing a polymer is higher.

In this embodiment, the content of PAVE in the perfluoroelastomer (A2) is preferably not less than 18% by mole, more preferably not less than 21% by mole, further preferably not less than 25% by mole, from the viewpoint of a low glass transition temperature and satisfactory low temperature properties. Also the content of PAVE in the perfluoroelastomer (A2) is preferably not more than 35% by mole, more preferably not more than 32% by mole, further preferably not more than 30% by mole, from the viewpoint of increase in hardness of a crosslinked article, thus enhancing sealing property of the sealing material.

Further, in this embodiment, a third perfluoroelastomer other than the perfluoroelastomers (A1) and (A2) may be mixed into the composition.

If only perfluoroelastomers having a smaller content of PAVE unit are used, a crosslinking time becomes longer. On the contrary, according to the present invention, as mentioned above, shortening of a crosslinking time can be achieved by combining at least two kinds of perfluoroelastomers, that is, one having a larger content of PAVE unit and another one having a smaller content of PAVE unit. Further hardness of an obtained molded article can be easily adjusted by combining such two kinds of perfluoro elastomers.

In this case, examples of PAVE are, as set forth in the above-noted embodiments, for instance, perfluoromethylvinyl ether (PMVE), perfluoropropylvinyl ether (PPVE) and the like. These can be used alone or can be used in optional combination thereof to such an extent not to impair the effect of the present invention.

Among these, PMVE is preferable from the viewpoint of an excellent mechanical strength of a cured article.

It is also preferable in this embodiment, that the perfluoroelastomer (A) further contains a monomer unit (b) having at least one kind selected from the group consisting of a nitrile group, a carboxyl group and an alkoxycarbonyl group.

From the viewpoint of enhancing crosslinkability of the crosslinkable elastomer, the content of monomer unit (b) in perfluoroelastomer (A) is not less than 0.1% by mole, preferably not less than 0.2% by mole, more preferably not less than 0.3% by mole. In addition, the content of monomer unit (b) in the perfluoroelastomer (A) is not more than 2.0% by mole, preferably not more than 1.0% by mole, more preferably not more than 0.5% by mole in that the amount of expensive monomer unit (b) can be reduced.

Examples of the monomer unit (b) are, for instance, monomers represented by the formula (A) as noted hereinabove:

$$CF_2=CFO(CF_2CF(CF_3)O)_m(CF_2)_n-X^1 \quad (A)$$

wherein m is 0 or an integer of 1 to 5, n is an integer of 1 to 3, $X^1$ is a nitrile group, a carboxyl group or an alkoxycarbonyl group. These can be used alone or can be used in optional combination thereof.

The nitrile group, carboxyl group or alkoxycarbonyl group can function as a cure site. In addition, from the viewpoint of excellent crosslinkability, the monomer unit (b) is preferably a nitrile group-containing monomer in which a cure site is a nitrile group.

Examples of the monomer unit (b) are monomers represented by the formulae (1) to (17) in a manner as noted above:

$$CY_2=CY(CF_2)_n-X^2 \quad (1)$$

wherein Y is hydrogen atom or fluorine atom, n is an integer of 1 to 8, $$CF_2=CFCF_2R_f^2-X^2 \quad (2)$$

where $R_f^2$ is $-(OCF_2)_n-$ or $-(OCF_2)_n-$, n is 0 or an integer of 1 to 5, $$CF_2=CFCF_2(OCF(CF_3)CF_2)_m(OCH_2CF_2CF_2)_n OCH_2CF_2-X^2 \quad (3)$$

wherein m is 0 or an integer of 1 to 5, n is 0 or an integer of 1 to 5, $$CF_2=CFCF_2(OCH_2CF_2CF_2)_m(OCF(CF_3)CF_2)_n OCF(CF_3)-X^2 \quad (4)$$

wherein m is 0 or an integer of 1 to 5, n is 0 or an integer of 1 to 5, $$CF_2=CF(OCF_2CF(CF_3))_n O(CF_2)_n-X^2 \quad (5)$$

wherein m is 0 or an integer of 1 to 5, n is an integer of 1 to 8, $$CF_2=CF(OCF_2CF(CF_3))_m-X^2 \quad (6)$$

wherein m is an integer of 1 to 5, $$CF_2=CFOCF_2(CF(CF_3)OCF_2)_n CF(-X^2)CF_3 \quad (7)$$

wherein n is an integer of 1 to 4, $$CF_2=CFO(CF_2)_n OCF(CF_3)-X^2 \quad (8)$$

wherein n is an integer of 2 to 5, $$CF_2=CFO(CF_2)_n-(C_6H_4)-X^2 \quad (9)$$

wherein n is an integer of 1 to 6

$$CF_2=CF(OCF_2CF(CF_3))_n OCF_2CF(CF_3)-X^2 \quad (10)$$

wherein n is an integer of 1 to 2, $$CH_2=CFCF_2O(CF(CF_3)CF_2O)_n CF(CF_3)-X^2 \quad (11)$$

wherein n is 0 or an integer of 1 to 5, $$CF_2=CFO(CF_2CF(CF_3)O)_m(CF_2)_n-X^2 \quad (12)$$

wherein m is 0 or an integer of 1 to 5, n is an integer of 1 to 3, $$CH_2=CFCF_2OCF(CF_3)OCF(CF_3)-X^2 \quad (13)$$

$$CH_2=CFCF_2OCH_2CF_2-X^2 \quad (14)$$

$$CF_2=CFO(CF_2CF(CF_3)O)_m CF_2CF(CF_3)-X^2 \quad (15)$$

wherein m is an integer of not less than 0, $$CF_2=CFOCF(CF_3)CF_2O(CF_2)_n-X^2 \quad (16)$$

wherein n is an integer of not less than 1, $$CF_2=CFOCF_2OCF_2CF(CF_3)OCF_2-X^2 \quad (17)$$

in which in the formulae (1) to (17), $X^2$ is a nitrile group (—CN group), a carboxyl group (—COOH group) or an alkoxycarbonyl group (—COOR$^5$, wherein $R^5$ is an alkyl group having 1 to 10 carbon atoms which may have fluorine atom). Among these, perfluorinated compounds containing no hydrogen atom are preferable from the viewpoint of excellent heat resistance of the perfluoroelastomer (A) and for preventing decrease of a molecular weight due to chain transfer when synthesizing the perfluoroelastomer by polymerization reaction. In addition, a compound having a $CF_2$=CFO— structure is preferable from the viewpoint of excellent polymerization reactivity with tetrafluoroethylene.

Examples of such perfluoroelastomers (A) are those disclosed in Japanese Kokai No. 9-512569A, International Application WO 00/29479, and Japanese Kokai No. 11-92529A, etc.

Those perfluoroelastomers (A) in this embodiment can be prepared by known methods.

The radical polymerization initiator used in this embodiment of the present invention may be one that is used for polymerization of fluorine-containing rubbers, and examples thereof are organic and inorganic peroxides and azo compounds. Represented initiators are persulfates, percarbonates, peresters and the like, and a preferable initiator is APS. APS may be used alone or can be used in combination with reducing agents such as sulfites and sulfites.

As noted elsewhere herein, the emulsifier used for emulsion polymerization can be selected from a wide range, and from the viewpoint of inhibiting a chain transfer reaction to the emulsifier molecules which occurs during the polymerization, salts of carboxylic acid having a fluorocarbon chain or a fluoropolyether chain are preferable. The amount of the emulsifier is preferably about 0.05 to 2% by weight, particularly preferably 0.2 to 1.5% by weight based on the added water.

The monomer mixture gas used in the present invention is explosive as described in Advances in Chemistry Series, G. H. Kalb, et al., 129, 13 (1973), and therefore it is necessary to take any measures for polymerization equipment not to cause sparking which becomes an ignition source.

The polymerization pressure can be changed in a wide range, and generally is within a range from 0.5 to 7 MPa. The higher the polymerization pressure is, the higher a polymerization rate is. Accordingly from the viewpoint of enhancement of productivity, the polymerization pressure is preferably not less than 0.7 MPa.

For introducing at least one selected from the group consisting of a nitrile group, a carboxyl group and an alkoxycarbonyl group to the fluorine-containing elastomer used in the present invention, as mentioned above, there is a method of copolymerizing by adding a monomer having a cure site when preparing the fluorine-containing elastomer in this embodiment. An example of another method is a method of subjecting a polymerization product to acid treatment to convert a group such as a metallic salt or ammonium salt of a carboxylic acid contained in the polymerization product to carboxyl group. An example of a suitable acid treatment method is a method of washing with hydrochloric acid, sulfuric acid or nitric acid or a method of decreasing a pH value of a mixture system after the polymerization reaction to 3 or less by using the mentioned acid.

In addition, it is possible to introduce a carboxyl group by oxidizing a crosslinkable elastomer containing iodine or bromine with a fuming nitric acid.

It is preferable that the fluorine-containing elastomer composition of this embodiment of the present invention comprises the crosslinking agent (B) crosslinkable with the group of the above-mentioned fluorine-containing elastomer being capable of acting as a cure site.

The crosslinking agent(s) (B) used in the present invention is at least one crosslinking agent selected from the group consisting of an oxazole crosslinking agent, an imidazole crosslinking agent, a thiazole crosslinking agent, a triazine crosslinking agent, an amidoxime crosslinking agent and an amidrazone crosslinking agent. Of these, an imidazole crosslinking agent is preferable in that a crosslinked article having excellent mechanical strength, heat resistance, chemical resistance and cold resistance, particularly a crosslinked article being excellent in heat resistance and cold resistance in good balance can be provided.

From the viewpoint of heat resistance, the preferred examples of an oxazole crosslinking agent, an imidazole crosslinking agent, a thiazole crosslinking agent and a triazine crosslinking agent is at least one compound selected from the group consisting of a compound containing at least two crosslinkable reaction groups represented by the formula (II) as noted above:

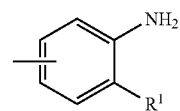
(II)

wherein $R^1$ groups are the same or different and each is $-NH_2$, $-NHR^2$, $-OH$ or $-SH$; $R^2$ is a monovalent organic group,
a compound represented by the formula (III):

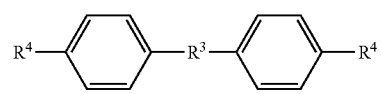
(III)

wherein $R^3$ is $-SO_2-$, $-O-$, $-CO-$, an alkylene group having 1 to 6 carbon atoms, a perfluoroalkylene group having 1 to 10 carbon atoms or a single bond; $R^4$ is

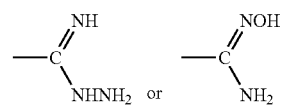

a compound represented by the formula (IV):

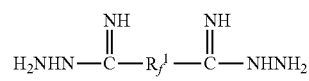
(IV)

in which $R_f^1$ is a perfluoroalkylene group having 1 to 10 carbon atoms, and a compound represented by the formula (V):

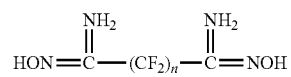
(V)

in which n is an integer of 1 to 10.

Of these compounds, as with other embodiments noted herein, the compound containing at least two crosslinkable reaction groups represented by the formula (II) is preferable in that heat resistance is enhanced due to stabilization by aromatic rings after the crosslinking.

The compound containing at least two crosslinkable reaction groups represented by the formula (II) is preferably one having 2 or 3 crosslinkable reaction groups, more preferably one having 2 crosslinkable reaction groups. When the number of crosslinkable reaction groups represented by the formula (II) is less than 2, crosslinking cannot be achieved.

$R^2$ contained in the substituent $R^1$ of the crosslinkable reaction group represented by the formula (II) is a monovalent organic group other than hydrogen atom. Since an $N-R^2$ bond is higher in oxidation resistance than a $N-H$ bond, it is preferable to use $-NHR^2$ as the substituent $R^1$ as noted above.

The monovalent organic group is not limited particularly, and examples thereof are an aliphatic hydrocarbon group, a phenyl group and a benzyl group. Specifically, for example, at least one of $R^2$ is a lower alkyl group having 1 to 10, particularly 1 to 6 carbon atoms such as —$CH_3$, —$C_2H_5$ or —$C_3H_7$; a fluorine atom-containing lower alkyl group having 1 to 10, particularly 1 to 6 carbon groups such as —$CF_3$, —$C_2F_5$, —$CH_2F$, —$CH_2CF_3$ or —$CH_2C_2F_5$; a phenyl group; a benzyl group; a phenyl group or a benzyl group, in which 1 to 5 hydrogen atoms are substituted by fluorine atoms such as —$C_6F_5$ or —$CH_2C_6F_5$; or a phenyl group or a benzyl group, in which 1 to 5 hydrogen atoms are substituted by —$CF_3$ such as —$C_6H_{5-n}(CF_3)_n$ or —$CH_2C_6H_{5-n}(CF_3)_n$ wherein n is an integer of 1 to 5.

Among these, a phenyl group and —$CH_3$ are preferable from the viewpoint of especially excellent heat resistance, satisfactory crosslinkability and relatively easy synthesis.

From the viewpoint of easy synthesis, preferable as the crosslinking agent (B) are compounds which have two crosslinkable reaction groups represented by the formula (II) and are represented by the formula (VIII) as noted above:

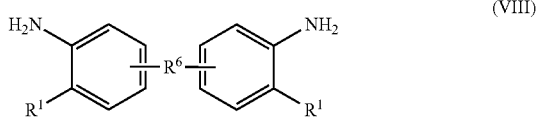

(VIII)

wherein $R^1$ is as defined above, $R^6$ is —$SO_2$—, —O—, —CO—, an alkylene group having 1 to 6 carbon atoms, a perfluoroalkylene group having 1 to 10 carbon atoms, a single bond or a group represented by:

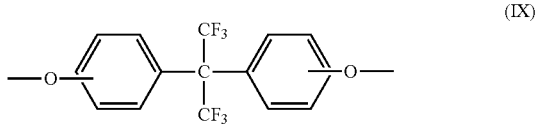

(IX)

Preferable examples of alkylene groups having 1 to 6 carbon atoms, as noted above, are methylene, ethylene, propylene, butylene, pentylene, hexylene and the like. Examples of perfluoroalkylene groups having 1 to 10 carbon atoms are

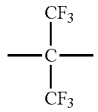

and the like. These compounds are known as examples of bisdiaminophenyl compound in Japanese Patent No. 2-59177B, and Japanese Kokai No. 8-120146A, etc.

Among these compounds, more preferable compounds as the crosslinking agent (B) are compounds represented by the formula (X):

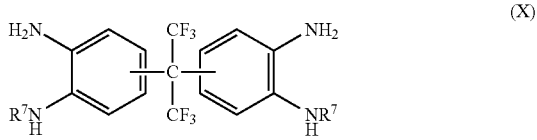

(X)

wherein $R^7$ groups are the same or different and each is hydrogen atom, an alkyl group having 1 to 10 carbon atoms; an alkyl group having 1 to 10 carbon atoms and containing fluorine atom; a phenyl group; a benzyl group; or a phenyl group or benzyl group, in which 1 to 5 hydrogen atoms are replaced by fluorine atoms and/or —$CF_3$.

Non-limiting examples thereof are as with other embodiments herein, for instance, 2,2-bis(3,4-diaminophenyl)hexafluoropropane, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl]hexafluoropropane, 2,2-bis[3-amino-4-(N-benzylamino)phenyl]hexafluoropropane, and the like. Of these, from the viewpoint of excellent heat resistance, 2,2-bis[3-amino-4-(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane and 2,2-bis[3-amino-4-(N-phenylamino)phenyl]hexafluoropropane are preferable, and from the viewpoint of particularly excellent heat resistance, 2,2-bis[3-amino-4-(N-phenylamino)phenyl]hexafluoropropane is preferable.

The bisamidoxime crosslinking agent, bisamidrazone crosslinking agent, bisaminophenol crosslinking agent, bisaminothiophenol crosslinking agent or bisdiaminophenyl crosslinking agent react with a nitrile group, a carboxyl group or an alkoxycarbonyl group of the fluorine-containing elastomer and form an oxazole ring, a thiazole ring, an imidazole ring or a triazine ring to provide a crosslinked article.

An amount of the crosslinking agent (B) is preferably not less than 0.3 part by weight, more preferably not less than 0.5 part by weight, further preferably not less than 0.7 part by weight based on 100 parts by weight of the elastomer, from the viewpoint of enhancing crosslinkability of the composition. In addition, the amount of the crosslinking agent (B) is preferably not more than 10.0 parts by weight, more preferably not more than 2.0 parts by weight based on 100 parts by weight of the elastomer.

In the present invention, in addition to the above-mentioned crosslinking agents, other crosslinking agents can be used together.

When the fluorine-containing elastomer contains a nitrile group, the fluorine-containing elastomer composition in this embodiment of the present invention may comprise an organotin compound such as tetraphenyltin, triphenyltin or the like because the nitrile group forms a triazine ring, thus making it possible to achieve triazine crosslinking.

In this embodiment of the present invention, an amount of such an organotin compound is preferably 0.05 to 10 parts by weight, more preferably 1 to 5 parts by weight based on 100 parts by weight of the fluorine-containing elastomer. When the amount of organotin compound is less than 0.05 part by weight, there is a tendency that the fluorine-containing elastomer is not sufficiently crosslinked, and when the amount of organotin compound is more than 10 parts by weight, physical properties of a crosslinked article tends to be deteriorated.

In the fluorine-containing elastomer composition of this embodiment of the present invention, usual additives may be added, as the case demands, to crosslinkable elastomer compositions, for example, a filler, a processing aid, a plasticizer and a colorant may be blended thereto. In addition, one or more usual crosslinking agents or crosslinking accelerators different from the above-mentioned ones may be blended to the composition. Also, a different kind of elastomer may be mixed to an extent not to impair the effects of the present invention.

Examples of a filler for this embodiment are organic fillers, and from the viewpoint of heat resistance and plasma resistance (reduced number of particles and low weight reduction rate at emission of plasma), there are preferably exemplified organic pigments; imide fillers having an imide structure such as polyimide, polyamide imide and polyetherimide; ketone engineering plastics such as polyether ether ketone (PEEK) and polyether ketone (PEK), and organic pigments are particularly preferable.

Examples of organic pigments for use in this embodiment are condensed azo pigments, isoindolenone pigments, quinacridone pigments, diketopyrrolopyrrole pigments, anthraquinone pigments, and the like. Among these pigments, from the viewpoint of excellent heat resistance and chemical resistance and less effect on characteristics of a molded article, quinacridone pigments, diketopyrrolopyrrole pigments and anthraquinone pigments are preferable, and quinacridone pigments are more preferable.

Further the fluorine-containing crosslinkable composition of this embodiment of the present invention may contain a general filler.

Examples of such general fillers are organic fillers made of engineering plastics such as polyarylate, polysulfone, polyether sulfone, polyphenylene sulfide, polyoxybenzoate and polytetrafluoroethylene powder; metallic oxide fillers such as aluminum oxide, silicon oxide, yttrium oxide and titanium oxide; metallic carbides such as silicon carbide and aluminum carbide, metallic nitride fillers such as silicon nitride and aluminum nitride; and inorganic fillers such as aluminum fluoride, carbon fluoride, barium sulfate, carbon black, silica, clay and talc.

Among these fillers, from the viewpoint of an effect of shielding various plasmas, aluminum oxide, yttrium oxide, silicon oxide, polyimide and carbon fluoride are preferable.

Also, the above-mentioned inorganic fillers and organic fillers may be used alone or may be blended in combination of two or more thereof.

The fluorine-containing elastomer composition of this embodiment of the present invention can be prepared by mixing each of the above-mentioned components by using usual processing equipment for rubber, for example, an open roll, Banbury mixer, kneader, or the like. In addition, the composition can be prepared also by a method of using a closed mixer and a method of co-coagulation through emulsion mixing.

A hardness in Shore A of a crosslinked article obtained by crosslinking the fluorine-containing elastomer of this embodiment of the present invention is preferably not less than 50, more preferably not less than 55, further preferably not less than 60 in that sealing property of the sealing material made of the elastomer composition of the present invention is satisfactory. In addition, the hardness of a crosslinked article is preferably not more than 95, more preferably not more than 90, further preferably not more than 85 in that sealing property of the sealing material made of the elastomer composition of the present invention is satisfactory.

A crosslinked article obtained by crosslinking and molding the fluorine-containing elastomer composition of this embodiment of the present invention is excellent in chemical resistance, mechanical strength and heat resistance. Also, according to this embodiment of the present invention, since adjustment of the hardness can be carried out by combining two kinds of perfluoroelastomers, the hardness can be adjusted to a desired one even without adding a filler. In this case, the cured article is suitable as a sealing material for sealing of, for example, semiconductor equipment from the viewpoint of improvement in reduction of pollution of working environment because outgas component generated from the cured article is reduced. Examples of the sealing material are O-ring, square ring, gasket, packing, oil seal, bearing seal, lip seal, etc.

In the present invention, the semiconductor manufacturing equipment is not limited particularly to equipment for producing semiconductors and encompasses whole manufacturing equipment used in the field of semiconductors where a high degree of cleanliness is required, such as equipment for manufacturing a liquid crystal panel and a plasma panel. Examples of the semiconductor manufacturing equipment are as follows.

(1) Etching System
  Dry etching equipment
  Plasma etching machine
  Reactive ion etching machine
  Reactive ion beam etching machine
  Sputter etching machine
  Ion beam etching machine
  Wet etching equipment
  Ashing equipment
(2) Cleaning System
  Dry etching cleaning equipment
  UV/O3 cleaning machine
  Ion beam cleaning machine
  Laser beam cleaning machine
  Plasma cleaning machine
  Gas etching cleaning machine
  Extractive cleaning equipment
  Soxhlet extractive cleaning machine
  High temperature high pressure extractive cleaning machine
  Microwave extractive cleaning machine
  Supercritical extractive cleaning machine
(3) Exposing System
  Stepper
  Coater and developer
(4) Polishing System
  CMP equipment
(5) Film Forming System
  CVD equipment
  Sputtering equipment
(6) Diffusion and Ion Implantation System
  Oxidation and diffusion equipment
  Ion implantation equipment The invention will now be explained with Examples but is not limited to the Examples.

EXAMPLE 1

A compound used in this Example is shown below. The compound (NPh-AF) represented below is used as a curing or crosslinking agent.

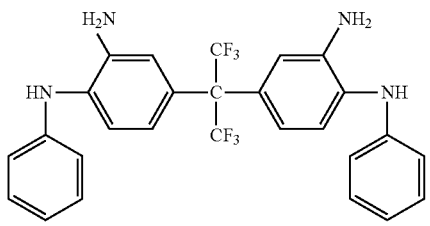 [SMILES: Nc1cc(C(c2ccc(Nc3ccccc3)c(N)c2)(C(F)(F)F)C(F)(F)F)ccc1Nc1ccccc1]

Preparation Example 1

Synthesis of Perfluoroelastomer (1)

Into a 6-liter stainless steel autoclave having no ignition source were poured 2.34 liters of pure water, 23.4 g of

as an emulsifying agent and 0.21 g of $(NH_4)_2CO_3$, and the inside of the system was sufficiently replaced with nitrogen gas and subjected to deaeration. Then, the autoclave was heated up to 52° C. with stirring at 600 rpm, and a gas mixture of tetrafluoroethylene (TFE) and perfluoro(methyl vinyl ether) (PMVE) (molar ratio of TFE/PMVE=22/78) was introduced so that the inside pressure became 0.78 MPa·G. Then, after introducing 0.82 g of $CF_2\!=\!CFO(CF_2)_5CN$ with pressurized nitrogen gas, a solution prepared by dissolving 12.3 g of ammonium persulfate (APS) in 30 g of water, was introduced with pressurized nitrogen gas to initiate a reaction.

As the polymerization proceeded, the inside pressure of the reactor decreased, and pressurized TFE and PMVE were introduced so that the inside pressure became 0.78 MPa·G. Until completion of the polymerization, 323 g of TFE and 356 g of PMVE were introduced in a specific ratio. During the reaction, pressurized $CF_2\!=\!CFO(CF_2)_5CN$ was introduced 17 times, totaling 14.67 g to obtain 2,989 g of an aqueous dispersion having a solids content of 21.2% by weight.

Out of the obtained aqueous dispersion, 500 g was distilled with 500 g water, and the distilled solution was slowly added to 2,800 g of 3.5% by weight aqueous solution of hydrochloric acid with stirring. After completion of the addition, the solution was stirred for five minutes, and then a coagulated product was filtered off. The obtained polymer was poured into 2 kg of HCFC-141b, followed by 5-minute stirring and filtering off again. Thereafter washing with HCFC-141b and filtering off were repeated four more times, followed by vacuum drying at 60° C. for 72 hours to obtain 110 g of a polymer (Perfluoroelastomer (1)).

According to F-NMR analysis, contents of each monomer of the obtained Perfluoroelastomer (1) are as shown in Table 1.

EXAMPLE 2

Preparation Example 2

Synthesis of Perfluoroelastomer (2)

Into a 6-liter stainless steel autoclave having no ignition source were poured 2.34 liters of pure water, 23.4 g of

as an emulsifying agent and 0.21 g of $(NH_4)_2CO_3$, and the inside of the system was sufficiently replaced with nitrogen gas and subjected to deaeration. Then the autoclave was heated up to 52° C. with stirring at 600 rpm, and a gas mixture of TFE and PMVE (molar ratio of TFE/PMVE=41/59) was introduced so that the inside pressure became 0.78 MPa·G. Then, after introducing 0.87 g of $CF_2\!=\!CFO(CF_2)_5CN$ with pressurized nitrogen gas, a solution prepared by dissolving 12.3 g of APS in 30 g of water, was introduced with pressurized nitrogen gas to initiate a reaction.

As the polymerization proceeded, the inside pressure of the reactor decreased, and pressurized TFE and PMVE were introduced so that the inside pressure became 0.78 MPa·G. Until completion of the polymerization, 400 g of TFE and 284 g of PMVE were introduced in a specific ratio. During the reaction, pressurized $CF_2\!=\!CFO(CF_2)_5CN$ was introduced 17 times totaling 14.72 g to obtain 3,087 g of an aqueous dispersion having a solids content of 22.5% by weight.

Out of the obtained aqueous dispersion, 500 g was distilled with 500 g water, and the distilled solution was slowly added to 2,800 g of 3.5% by weight aqueous solution of hydrochloric acid with stirring. After completion of the addition, the solution was stirred for five minutes, and then a coagulated product was filtered off. The obtained polymer was poured into 2 kg of HCFC-141b, followed by 5 minutes of stirring and filtering off again. Thereafter washing with HCFC-141b and filtering off were repeated four more times, followed by vacuum drying at 60° C. for 72 hours to obtain 110 g of a polymer (Perfluoroelastomer 2).

According to F-NMR analysis, contents of each monomer of the obtained Perfluoroelastomer (2)

TABLE 1

| Content (% by mole) | Perfluoroelastomer (1) | Perfluoroelastomer (2) |
|---|---|---|
| PMVE | 41.7 | 30.2 |
| TFE | 57.9 | 69.4 |
| $CF_2\!=\!CFO(CF_2)_5CN$ | 0.43 | 0.43 |

EXAMPLE 3

Perfluoroelastomer (1) from Example 1, Perfluoroelastomer (2) from Example 2 and NPh-AF (shown above) as a cross-linking agent were mixed in amounts as shown in Table 2, and kneaded with an open roll to prepare a crosslinkable fluorine-containing elastomer composition.

This fluorine-containing elastomer composition was subjected to crosslinking by pressing at 180° C. for 20 minutes and further crosslinking in an oven at 290° C. for 18 hours to make a test sample O-ring (P-24). With respect to this test sample, crosslinkability at crosslinking and physical properties in the normal state were measured by the following methods. The results are shown in Table 2.

Crosslinkability: With respect to each crosslinkable composition, a vulcanization curve was obtained at 180° C. by using JSR type Curastometer Model II, and a minimum torque ($M_L$), a maximum torque ($M_H$), and induction time ($T_{10}$) and an optimum vulcanization time ($T_{90}$) were determined.

Physical Properties in the Normal State: According to JIS K 6301, a 100% modulus ($M_{100}$), a tensile strength ($T_B$), an elongation ($E_B$) and hardness ($H_S$) of a 2 mm thick crosslinked article in a normal state (25° C.) were measured.

COMPARATIVE EXAMPLE 1

A composition was prepared in the same manner as in Example 3 with the exception that only Perfluoroelastomer (1) was used as a perfluoroelastomer instead of a combination use of Perfluoroelastomers (1) and (2). Then crosslinkability at crosslinking and physical properties in a normal state were measured in the same manner as Example 3. The results are shown also in Table 2.

COMPARATIVE EXAMPLE 2

A composition was prepared in the same manner as in Example 3 with the exception that only Perfluoroelastomer (2) was used as a perfluoroelastomer instead of a combination use of Perfluoroelastomers (1) and (2). Then crosslinkability at crosslinking and physical properties in a normal state were measured in the same manner as Example 3. The results are shown also in Table 2.

TABLE 2

| Amount (parts per 100) | Example 3 | Comparative Example 1 | Comparative Example 2 |
|---|---|---|---|
| Perfluoroelastomer (1) | 50 | 100 | — |
| Perfluoroelastomer (2) | 50 | — | 100 |
| NPh-AF | 1.0 | 1.0 | 1.0 |
| Results of evaluation Crosslinkability | | | |
| $M_L$ (kgf) | 0.72 | 0.42 | 1.12 |
| $M_H$ (kgf) | 3.03 | 2.50 | 3.33 |
| $T_{10}$ (min) | 5.6 | 4.3 | 7.3 |
| $T_{90}$ (min) | 16.3 | 9.5 | 44.5 |
| Physical Properties in Normal State | | | |
| $M_{100}$ (MPa) | 2.1 | 1.3 | 3.2 |
| $T_B$ (MPa) | 16.0 | 6.7 | 20.8 |
| $E_B$ (%) | 250 | 275 | 225 |
| $H_S$ (Shore A) | 68 | 59 | 78 |

EXAMPLES 4-14

The elastomeric compositions in the Examples 4-14 were produced by mixing or blending the perfluoropolymers with any desired additives. The polymer(s) and any additives may be blended using an internal mixer such as those commercially available from C. W. Brabender Instruments, Inc. of S. Hackensack, N.J. or other internal mixers such as are commercially available from Morijama of Farmingdale, N.Y. Examples 4-12 were prepared by blending in a two-roll mixer (also called "open mill mixer"), with 6-inch diameter, using a regular rubber compounding mixing method known in the art. The roll temperature was about 50° C. with a roll speed of about 25 to 35 rpm for a batch weight of 500 grams.

The method of preparation included adding the first polymer onto the mill at 50° C. and mixing for approximately 8-9 minutes. After the first curable perfluoropolymer was sheeted out on the mill, the second curable perfluoropolymer was added. After mixing both polymers for another 3-4 minutes, the curative was added and mixed thoroughly. After adding the curative, the blend was cut and mixed on the rolls 3 times, and then cut/mixed 30 times. The blend was taken off the mill and cooled down to about room temperature. Once cooled, the blend was placed back into the mill and cut/mixed multiple times.

A standard regular rubber compounding procedure was used except for the mixing temperature 50° C. and the cutting and remixing steps (3+30+30 cut/remixing).

For Examples 13 and 14, the internal mixer first used was at 50° C. to mix a master batch concentrate by adding the first perfluoropolymer and the curative based on the formulation of the master batch concentrate. The master batch included Polymer A in 100 parts by weight and NPh-AF (in an amount of 6.8 parts per hundred parts by weight). The master batch was then diluted to prepare the formulations noted for Examples 13 and 14. The master batch concentrate was unloaded from the internal mixer and moved to an open mill. The same procedures as described above were followed for Examples 4-12 except for adding the master batch concentrate having curatives in the last step (instead of the curative only).

It will be recognized that these procedures were for these examples only and that any other standard rubber compounding mixer or regular internal mixer could be used within the invention.

Examples of elastomer compositions and molded articles prepared according to the methods of the present invention are set forth below in Table 3. Included in Table 3 are the physical characteristics of elastomers formed by the present invention. Examples 4-14 were tested for properties using ASTM procedures identified in Table 4, and the physical property parameters were recorded: $T_b$ (tensile at break in psi (MPa)); $E_B$ (elongation at break in %); $M_{100}$ (100% modulus in psi (MPa)), Hardness (Durometer M) and Compression set of the O-rings prepared from the elastomers.

The example compounds were prepared from a commercially available perfluoropolymer composition and mixed as discussed herein. In the examples, Polymer A from Daikin Industries is the first perfluoropolymer as defined herein and is a perfluoropolymer of TFE and perfluoromethylvinyl ether (PMVE) in a molar ratio of 60/40. Polymer B from Daikin Industries is the second polymer used and is a perfluoropolymer of TFE and PMVE in a molar ratio of 70/30. In both of Polymers A and B, there is 0.6 mole percent of a cure site monomer included a cyano-functional group for curing. The curative, NPh-AF is 4,4'[2,2,2-Trifluoro-1-(trifluoromethyl) ethylidene]bis[N1-phenyl-1,2-benzenediamine]. Each of the components, Polymer A and B, and NPh-AF are commercially available. The weight percentage ratios of the resultant example elastomers (Examples 4-14) vary as described in Table 3. The compounds were cured at 182° C. for 30 minutes followed by postcuring at 290° C. for 18 hours.

The molded articles, most commonly an O-ring, seal or gasket, formed from an elastomer of the present invention, are described herein. Seals can be formed from the perfluoropolymers by a variety of processing methods, such as compression molding, injection molding, extrusion, etc. Molding was used in the Examples herein.

As illustrated in Table 3, after testing in remote $NF_3$ plasma at high temperature, the samples showed insignificant weight loss. The sample integrity and surface appearance showed no significant change. Compared to the commercial samples as controls, the working examples display better resistance to remote $NF_3$ plasma. In direct plasma environments ($O_2$, $O_2+CF_4$), the results are comparable to the commercial products.

O-rings were formed from the resultant elastomers of Examples 4-14 for evaluation of compression set. Examples 4-14 each showed less than 25 percent compression set after 300° C. for 70 hours under 25% deflection and showed less than 40 percent compression set after 300° C. for 168 hours under 25% deflection. This is a significant improvement in the art.

The O-rings formed from the elastomers of Examples 4-14 were subjected to a plasma gas environment and evaluated. The percent loss is defined for each in Table 3 based on the internal screening method listed in Table 4.

TABLE 3

| Formulation | Ex.4 | Ex.5 | Ex. 6 | Ex.7 | Ex.8 | Ex. 9 |
|---|---|---|---|---|---|---|
| Polymer B (weight ratio) | 50 | 50 | 50 | 65 | 65 | 65 |
| Polymer A (weight ratio) | 50 | 50 | 50 | 35 | 35 | 35 |
| NPh-AF | 0.7 | 0.8 | 0.9 | 0.7 | 0.8 | 0.9 |
| $T_B$: psi (MPa) | 944 (6.51) | 1049 (7.23) | 978 (6.74) | 1388 (9.57) | 1130 (7.79) | 1370 (9.45) |
| Eb (%) | 271 | 262 | 261 | 263 | 258 | 260 |
| $M_{100}$: psi (MPa) | 193 (1.33) | 216 (1.49) | 200 (1.38) | 242 (1.67) | 236 (1.63) | 250 (1.72) |
| Density | 2.055 | 2.0575 | 2.056 | 2.061 | 2.061 | 2.063 |
| Shore M Hardness | 71 | 71.5 | 71.5 | 72.5 | 72.5 | 73 |
| Shore A Hardness | 63.5 | 64 | 64.5 | 65 | 65.5 | 66.5 |
| Compression set (%) (300° C./70 hrs) | 21.2 | 19.7 | 17.3 | 20.3 | 20.3 | 17.4 |
| Compression set (%) (300° C./168 hrs) | 33.5 | 30.9 | 29.4 | 27.6 | 33.5 | 30.0 |
| Stiction: lbs (N) | 41.0 (182.4) | 40.6 (180.6) | 41.5 (184.6) | 45.9 (204.2) | 46.0 (204.6) | 46.9 (208.6) |
| $NF_3$ remote, 6 hrs/220° C. (% loss) | 0.023 | 0.022 | −0.024 | 0.108 | 0.116 | 0.069 |
| $O_2$ direct ICP, 30 min. (% loss) | 2.82 | 2.94 | 2.87 | 2.72 | 2.84 | 2.95 |
| $O_2$ + $CF_4$ direct ICP (% loss) | 2.98 | 2.89 | 2.93 | 2.92 | 2.98 | 2.91 |
| $NF_3$ remote, 12 hrs/250° C. loss | 0.084 | 0.006 | −0.041 | −0.001 | 0.065 | 0.034 |
| $O_2$ Direct, 80° C./60 min ICP (% loss) | 4.243 | 4.395 | 4.690 | 4.718 | 5.081 | 5.134 |
| $O_2$ + $CF_4$ Direct/80° C./60 min, ICP (% loss) | 4.469 | 4.687 | 4.875 | 4.907 | 5.275 | 5.526 |
| RIE $O_2$ plasma, 90 min. (% loss) | 3.453 | 3.288 | 3.006 | 3.076 | 2.609 | 3.234 |

| Formulation | Ex. 10 | Ex. 11 | Ex. 12 | Ex. 13 | Ex. 14 |
|---|---|---|---|---|---|
| Polymer B (weight ratio) | 35 | 35 | 35 | 50 | 50 |
| Polymer A (weight ratio) | 65 | 65 | 65 | 50 | 50 |
| NPh-AF | 0.7 | 0.8 | 0.9 | 0.9 | 0.9 |
| $T_B$: psi (MPa) | 847 (5.84) | 933 (6.43) | 894 (6.16) | 1103 (7.61) | 1052 (7.26) |
| Eb (%) | 270 | 262 | 249 | 256 | 261 |
| $M_{100}$: psi (MPa) | 184 (1.27) | 198 (1.37) | 217 (1.50) | 231 (1.59) | 217 (1.50) |
| Density | 2.050 | 2.056 | 2.055 | 2.054 | 2.057 |
| Shore M Hardness | 70 | 70 | 70 | 71.5 | |
| Shore A Hardness | 61.5 | 62 | 62.5 | 65.5 | 63.5 |
| Compression set (%) (300° C./70 hrs) | 17.7 | 18.5 | 17.1 | 17.1 | 17.7 |
| Compression set (%) (300° C./168 hrs) | 35.0 | 25.2 | 31.4 | 31.6 | 29.7 |
| Stiction: lbs (N) | 38.9 (173.0) | 40.2 (178.8) | 40.5 (180.1) | 40.1 (178.4) | 40.4 (179.7) |
| $NF_3$ remote, 6 hrs/220° C. (% loss) | 0.070 | −0.022 | 0.046 | 0.000 | −0.023 |
| $O_2$ direct ICP, 30 min. (% loss) | 2.97 | 3.07 | 2.84 | 2.8 | 2.77 |
| $O_2$ + $CF_4$ direct ICP (% loss) | 2.95 | 3.29 | 2.91 | 2.95 | 3.02 |
| $NF_3$ remote, 12 hrs/250° C. loss | 0.039 | 0.073 | 0.023 | 0.035 | 0.023 |
| $O_2$ Direct, 80° C./60 min ICP (% loss) | 5.482 | 5.546 | 5.522 | 5.493 | 5.255 |
| $O_2$ + $CF_4$ Direct/80° C./60 min, ICP (% loss) | 5.818 | 6.083 | 5.785 | 5.569 | 5.550 |
| RIE $O_2$ plasma, 90 min. (% loss) | 3.235 | 3.331 | 3.413 | 3.377 | 3.586 |

TABLE 4

| Properties | Testing Method |
|---|---|
| $M_H$: lb inch (N · m or kg · f as noted) | ASTM D 5289, average of 2 min sets; 360° F. (182.2° C.)/60 min. |
| $M_L$: lb inch (N · m or kg · f as noted) | |
| $T_{10}$ (min) | |
| $T_{50}$ (min) | |
| $T_{90}$ (min) | |
| $T_{s2}$ (min) | |
| $T_b$: psi (MPa) | Average of 10 O-rings, 20"/min, ASTM D 1414, ASTM D 412 |
| $E_b$ (%) | |
| $M_{100}$: psi (MPa) | |

TABLE 4-continued

| Properties | Testing Method |
|---|---|
| Density | ASTM D 792 |
| Shore M Hardness | ASTM D 2240 |
| Shore A Hardness | ASTM D 2240 |
| Compression set (%) (300° C./70 h) | ASTM D 1414/ASTM D 395 average of 10 |
| Compression set (%) (300° C./168 h) | ASTM D1414/ASTM D395 average of 10 |
| Stiction: lbs. (N) | Compression 25% between two Aluminum substrates, conditioning 392° F. (200° C.) for 24 hrs and cool for 1 h and then push O-ring of Al at 0.5"/min (0.2 mm/second). |
| $NF_3$ remote, 6 h/220° C. (% loss) | $NF_3$/Ar 1:1, 3 Torr, 220° C. (set up 300° C.) |
| $NF_3$ remote, 12 h/220° C. (% loss) | $NF_3$/Ar 1:1, 3 Torr, 220° C. (set up 300° C.) |
| $O_2$ direct ICP, 30 min. (% loss) | Power 400 W, flow 16 standard $cm^3$ per minute, pressure: 10 Pa, time: 30 min. |
| $O_2$ + $CF_4$ direct ICP (% loss) | Power 400 W, $O_2/CF_4$ 16/16standard $cm^3$ per |
| $NF_3$ remote, 12 h/250° C. (% loss) | Power 2500 W, pressure 990 mTorr, $NF_3$ 400 standard $cm^3$ per minute, Ar 50 standard $cm^3$ |
| $O_2$ Direct, 80° C./60 min ICP (% loss) | Power 590 W, pressure 100 mTorr, $O_2$: 32 |
| $O_2$ + $CF_4$ Direct/80° | Power 590 W, pressure 100 mTorr, $O_2/CF_4$ |
| RIE $O_2$ plasma AEC, 4400 seconds (% loss) | Power 300 W, pressure 300 mTorr. $O_2$: 60 |
| RIE $O_2$ + $CF_4$ plasma, AEC, 4400 seconds (% loss) | Power 300 W, pressure 300 mTorr, $O_2/CF_4$: 30/30 standard $cm^3$ per minute |

EXAMPLE 15

As noted elsewhere herein, the various fluorine-containing elastomers and perfluoroelastomer blends described herein can be bonded and molded onto metals and other substrates to form bonded products. Bonding samples were prepared and evaluated using the current ASTM-D-429 method A involving pulling two metal plates apart at a rate of 0.4 mm/second (1 inch/minute) at room temperature and recording bonding force. A blend of two perfluoropolymers according to the invention was molded in between two circular metal plate surfaces, each of which surface was treated with a bonding agent prior to the bonding process. The metal plates, which were 2 in² (12.9 cm²) in surface area, were sandblasted with 36-sized grit before use.

Perfluoroelastomer compound C was dissolved in Fluorinert® FC-77 to bond the blended composition of Example 9 in Table 3 onto aluminum and steel surfaces. Example 9's compositions included Polymer A in 35 parts per hundred, Polymer B in 65 parts per hundred and NPh-AF (in 0.9 parts per hundred). The bonding agent (Perfluoroelastomer compound C) included a perfluoroelastomer polymer having a nitrile-functionalized cure site monomer (FFKM, 100 parts), Aerosil® R972 (12 parts per hundred parts FFKM), 2,2-bis[3-amino-4-hydroxyphenyl]hexafluoropropane (1.5 parts per hundred curative), Cromophthal Blue A3R (0.5 parts per hundred as a colorant), Cromophthal Yellow 2RF (0.5 parts per hundred as a colorant), and Varox® DBPH-50 (1 part per hundred). In the polymer FFKM D, the molar ratio of TFE:PMVE:CSM of 53:44:3.

After dissolving Compound C in FC-77, the mixture was applied as a thin layer to a metal substrate. The solution was allowed to dry for 30 minutes and a pressed portion of the composition of Example 9 was molded onto the substrates at 360° F. (182.2° C.) for 30 minutes, and then postcured at 550° F. (287.8° C.) for 22 hours.

Table 5 shows the results from the bonding force tests.

TABLE 5

| Bonding Agent | Substrate | Before Postcure | After Postcure | Bonding Force lbs (N) |
|---|---|---|---|---|
| Compound C in FC-77, 1:15 | Al | 2-bonded* | 2-bonded | 1337 (5947), 895 (3981) |
| Compound C in FC-77, 1:6 | Al | 2-bonded | 2-bonded | 1390 (6183), 1449 (6445) |
| Compound C in FC-77, 1:15 | Steel | 2-bonded | 2-bonded | 1436 (6387), 1603 (7130) |
| Compound C in FC-77, 1:6 | Steel | bonded* | bonded | 1328 (5907), — |

*"2-bonded" means that both samples made were bonded and "bonded" means that only one sample was made and tested.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A curable perfluoroelastomeric composition comprising:
a first curable perfluoropolymer comprising tetrafluoroethylene, a first perfluoroalkylvinyl ether and at least one first cure site monomer having a cure site, wherein a molar ratio of the tetrafluoroethylene to the perfluoroalkylvinyl ether is about 0:100 to about 65:35 molar percentage in the perfluoropolymer;
a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether is about 65:35 to about 95:5 in the polymer, and wherein when the first and second curable perfluoropolymers include the same monomers, the molar ratio of the tetrafluoroethylene to the second perfluoroalkylvinyl ether in the second curable perfluoropolymer is different from the molar ratio of the tetrafluoroethylene to the first perfluoroalkylvinyl ether of the first curable perfluoropolymer; and at least one curative capable of curing the at least one first cure site monomer and the at least one second cure site monomer, wherein the composition comprises from about 0.6 to about 0.9 weight percentage of the curative, wherein the weight percentage ratio of the first perfluoropolymer to the second perfluoropolymer in the composition is about 65:35 to about 35:65 and, wherein upon cure the cured compositions have a compression set of less than 25% at 70 hours at 300° C. and are plasma resistant upon exposure to $NF_3$ plasma.

2. The composition according to claim 1, wherein the first curable perfluoropolymer comprises about 0 to about 58.5 mole percent of the tetrafluoroethylene, about 31.5 percent to about 99.99 mole percent of the first perfluoroalkylvinyl ether and about 0.1 mole percent to about 10 mole percent of the at least one first cure site monomer and the second curable perfluoropolymer comprises about 65 to about 85.5 mole percent of the tetrafluoroethylene, about 4.5 to about 35 mole percent of the second perfluoroalkylvinyl ether and about 0.1 mole percent to about 10 mole percent of the at least one second cure site monomer.

3. The composition according to claim 2, wherein the first curable perfluoropolymer comprises about 49.8 to about 63.1 mole percent of the tetrafluoroethylene, about 49.75 to about 34 mole percent of the first perfluoroalkylvinyl ether and about 0.5 mole percent to about 3 mole percent of the at least one first cure site monomer and the second curable perfluoropolymer comprises about 64.7 to about 82.5 mole percent of the tetrafluoroethylene, about 14.6 to about 34.83 mole percent of the second perfluoroalkylvinyl ether and about 0.5 mole percent to about 3 mole percent of the at least one second cure site monomer.

4. The composition according to claim 1, wherein the cure site of the at least one first cure site monomer and the cure site of the at least one second cure site monomer each is a functional group selected from the group consisting of a nitrile group, a carboxyl group and an alkoxycarbonyl group.

5. The composition according to claim 4, wherein the at least on first cure site monomer provides the functional group on at least one terminal end of the first curable perfluoropolymer and/or depending from a polymer backbone of the first curable perfluoropolymer.

6. The composition according to claim 4, wherein the at least one second cure site monomer provides the functional group on at least one terminal end of the first curable perfluoropolymer and/or depending from a polymer backbone of the first curable perfluoropolymer.

7. The composition according to claim 4, wherein the at least one curative reacts with the functional group of the at least one first cure site monomer and/or the at least one second cure site monomer to form benzoimidazole cross-linking structures.

8. The composition according to claim 1, further comprising at least one additional curable perfluoropolymer comprising tetrafluoroethylene, a perfluoroalkylvinyl ether and a cure site monomer.

9. A curable perfluoroelastomeric composition comprising:
a first curable perfluoropolymer comprising tetrafluoroethylene, a first perfluoroalkylvinyl ether and at least one first cure site monomer having a cure site, wherein a molar ratio of the tetrafluoroethylene to the perfluoroalkylvinyl ether is about 0:100 to about 65:35 molar percentage in the perfluoropolymer;

a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether is about 65:35 to about 95:5 in the polymer and wherein when the first and second curable perfluoropolymers include the same monomers, the molar ratio of the tetrafluoroethylene to the second perfluoroalkylvinyl ether in the second curable perfluoropolymer is different from the molar ratio of the tetrafluoroethylene to the first perfluoroalkylvinyl ether of the first curable perfluoropolymer; and at least one curative capable of curing the at least one first cure site monomer and the at least one second cure site monomer, wherein the subtracted difference in molar percentage content between the first perfluoroalkylvinyl ether and the second perfluoroalkylvinyl ether is about 5% to about 25% and wherein the weight percentage ratio of the first perfluoropolymer to the second perfluoropolymer in the composition is about 65:35 to about 35:65.

10. A cured perfluoroelastomeric composition, comprising:
a first perfluoroelastomer formed from a first curable perfluoropolymer comprising tetrafluoroethylene, a first perfluoroalkylvinyl ether and at least one first cure site monomer having a cure site, wherein a molar ratio of the tetrafluoroethylene to the perfluoroalkylvinyl ether is about 0:100 to about 65:35 molar percentage in the perfluoropolymer; and a second perfluoroelastomer formed from a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether is about 65:35 to about 95:5 in the second curable perfluoropolymer and wherein when the first and second curable perfluoropolymers include the same monomers, the molar ratio of the tetrafluoroethylene to the second perfluoroalkylvinyl ether in the second curable perfluoropolymer is different from the molar ratio of the tetrafluoroethylene to the first perfluoroalkylvinyl ether of the first curable perfluoropolymer, wherein the cured composition has a compression set of less than 25% at 70 hours at 300° C. and are plasma resistant upon exposure to $NF_3$ plasma.

11. The composition according to claim 10, wherein the first curable perfluoropolymer comprises about 0 to about 58.5 mole percent of the tetrafluoroethylene, about 31.5 percent to about 99.99 mole percent of the first perfluoroalkylvinyl ether and about 0.1 mole percent to about 10 mole percent of the at least one first cure site monomer and the second curable perfluoropolymer comprises about 65.0 to about 85.5 mole percent of the tetrafluoroethylene, about 4.5 to about 35 mole percent of the second perfluoroalkylvinyl ether and about 0.1 mole percent to about 10 mole percent of the at least one second cure site monomer.

12. The cured perfluoroelastomeric composition according to claim 10, wherein the first curable perfluoropolymer has a molar percentage ratio in the first curable perfluoropolymer of the tetrafluoroethylene to the first perfluoroalkylvinyl ether of about 50:50 to about 65:35 and the second curable perfluoropolymer has a molar percentage ratio in the second curable perfluoropolymer of the tetrafluoroethylene to the second perfluoroalkylvinyl ether of about 65:35 to about 85:15.

13. The cured perfluoroelastomeric composition according to claim 10, wherein the cure site of the at least one first cure site monomer and the cure site of the at least one second cure site monomer each is a functional group selected from the group consisting of a nitrile group, a carboxyl group and an alkoxycarbonyl group.

14. The cured perfluoroelastomeric composition according to claim 10, wherein at least one of the first perfluoroelastomer and the second perfluoroelastomer has a benzoimidazole cross-linking structure.

15. The cured perfluoroelastomeric composition according to claim 10, wherein a weight percentage ratio of the first perfluoroelastomer to the second perfluoroelastomer in the composition is about 1:99 to about 99:1.

16. The cured perfluoroelastomeric composition according to claim 15, wherein the weight percentage ratio of the first perfluoroelastomer to the second perfluoroelastomer in the composition is about 20:80 to about 80:20.

17. The cured perfluoroelastomeric composition according to claim 16, wherein the weight percentage ratio of the first perfluoroelastomer to the second perfluoroelastomer in the composition is about 75:25 to about 55:45.

18. The cured perfluoroelastomeric composition according to claim 10, wherein the difference in molar percentage ratio of the first perfluoroalkylvinyl ether to the second perfluoroalkylvinyl ether is about 5% to about 25%.

19. A molded article comprising the cured perfluoroelastomeric composition according to claim 10.

20. The molded article according to claim 19, wherein the molded article is an O-ring, a seal or a gasket.

21. The molded article according to claim 19, wherein the molded article is bonded to a surface comprising a metal or a metal alloy.

22. The molded article according to claim 21, wherein the molded article is bonded to surface of a door for sealing a semiconductor-processing chamber.

23. A method for making a cured perfluoroelastomeric composition comprising:
  (a) preparing a curable perfluoroelastomeric composition by combining:
    (i) a first curable perfluoropolymer comprising tetrafluoroethylene, a first perfluoroalkyl vinyl ether and at least one first cure site monomer having a cure site, wherein a molar ratio of the tetrafluoroethylene to the first perfluoroalkyl vinyl ether is about 0 to about 100 to about 65:35 in the perfluoropolymer;
    (ii) a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether is about 65:35 to about 95:5 in the polymer and wherein when the first and second curable perfluoropolymers include the same monomers, the molar ratio of the tetrafluoroethylene to the second perfluoroalkylvinyl ether in the second curable perfluoropolymer is different from the molar ratio of the tetrafluoroethylene to the first perfluoroalkylvinyl ether of the first curable perfluoropolymer; and
    (iii) at least one curative capable of curing the cure site of the at least one first cure site monomer and the cure site of the at least one second cure site monomer; and
  (b) curing the first and second curable perfluoropolymers in the perfluoroelastomeric composition to form a cured perfluoroelastomeric composition, wherein the cured composition has a compression set of less than 25% at 70 hours at 300° C. and are plasma resistant upon exposure to $NF_3$ plasma.

24. The method according to claim 23, wherein the cured perfluoroelastomeric composition comprises a benzoimidazole cross-linking structure.

25. The method according to claim 23, wherein step (b) further comprising curing the curable perfluoroelastomeric composition at a temperature of about 150° C. to about 250° C. for about 5 min to about 40 min.

26. The method according to claim 25, where step (b) further comprises a postcure at a temperature of about 250° C. to 320° C. for about 5 to about 48 hours.

27. The method according to claim 23, wherein step (a) further comprises combining (iv) at least one additive into the curable perfluoroelastomeric composition.

28. The method according to claim 23, wherein the method further comprising forming the curable perfluoroelastomeric composition into a molded article while curing the curable perfluoroelastomeric composition.

29. A curable perfluoroelastomeric composition comprising:
  a first curable perfluoropolymer comprising tetrafluoroethylene, a first perfluoroalkylvinyl ether and at least one first cure site monomer having a cure site, wherein a molar ratio of the tetrafluoroethylene to the perfluoroalkylvinyl ether is about 0:100 to about 65:35 molar percentage in the perfluoropolymer;
  a second curable perfluoropolymer comprising tetrafluoroethylene, a second perfluoroalkylvinyl ether which may be the same or different from the first perfluoroalkylvinyl ether, and at least one second cure site monomer having a cure site which may be the same or different from the at least one first cure site monomer, wherein a molar ratio of the tetrafluoroethylene to the second perfluoroalkylvinyl ether is about 65:35 to about 95:5 in the polymer, and wherein when the first and second curable perfluoropolymers include the same monomers, the molar ratio of the tetrafluoroethylene to the second perfluoroalkylvinyl ether in the second curable perfluoropolymer is different from the molar ratio of the tetrafluoroethylene to the first perfluoroalkylvinyl ether of the first curable perfluoropolymer; and
  at least one curative capable of curing the at least one first cure site monomer and the at least one second cure site monomer, wherein the composition comprises from about 0.6 to about 0.9 weight percentage of the curative, wherein the weight percentage ratio of the first perfluoropolymer to the second perfluoropolymer in the composition is about 65:35 to about 35:65 and the subtracted difference in molar percentage content between the first perfluoroalkylvinyl ether and the second perfluoroalkylvinyl ether is about 5% to about 25% and, wherein, upon cure, the cured compositions have a compression set of less than 25% at 70 hours at 300° C. and are plasma resistant upon exposure to $NF_3$ plasma.

* * * * *